United States Patent [19]
Pond et al.

[11] 4,401,886
[45] Aug. 30, 1983

[54] ELECTROMAGNETIC BEAM ACQUISITION AND TRACKING SYSTEM

[75] Inventors: C. Ray Pond, Federal Way; Reynold E. Wilbert, Seattle, both of Wash.

[73] Assignee: The Boeing Company, Seattle, Wash.

[21] Appl. No.: 246,439

[22] Filed: Mar. 23, 1981

[51] Int. Cl.$^3$ .............................................. G01C 1/00
[52] U.S. Cl. ................................ 250/203 R; 356/141; 356/152
[58] Field of Search ................ 250/201, 203; 350/6.1, 350/358; 369/44–46; 356/141, 152; 244/3.16

[56] References Cited

U.S. PATENT DOCUMENTS

| | | |
|---|---|---|
| 2,951,658 | 9/1960 | Jones, Jr. et al. |
| 3,130,308 | 4/1964 | Astheimer |
| 3,399,013 | 8/1968 | Aas et al. |
| 3,455,243 | 7/1969 | Martin |
| 3,485,559 | 12/1969 | De Maria |
| 3,617,016 | 2/1971 | Bolsey |
| 3,619,029 | 11/1971 | Crownover |
| 3,743,217 | 7/1973 | Turck |
| 3,780,217 | 12/1973 | Sawatari |
| 3,790,284 | 2/1974 | Baldwin |
| 3,796,495 | 3/1974 | Laub |
| 3,860,770 | 1/1975 | Nadler et al. ......................... 369/44 |
| 3,899,145 | 8/1975 | Stephenson |
| 3,917,196 | 11/1975 | Pond et al. |
| 3,935,818 | 2/1976 | Johnson et al. |
| 3,954,228 | 5/1976 | Davis, Jr. |
| 4,025,193 | 5/1977 | Pond et al. |
| 4,106,563 | 4/1977 | Pedinoff |
| 4,213,704 | 7/1980 | Burns et al. ...................... 356/152 X |
| 4,321,700 | 3/1982 | Russell ................................. 369/44 |

*Primary Examiner*—David C. Nelms
*Assistant Examiner*—Edward P. Westin
*Attorney, Agent, or Firm*—Christensen, O'Connor, Johnson & Kindness

[57] ABSTRACT

An electromagnetic (e.g., laser) beam acquisition and tracking system that is particularly useful onboard high-speed aircraft (10) to acquire and track a target (12) supporting a retroreflector (13) is disclosed. The acquisition and tracking system includes two deflection systems—a mechanical deflection system (19) and an acousto-optic deflection system (17)—for controlling the direction of the electromagnetic beam (14). The two deflection systems are serial, i.e., first one system deflects the beam and then the other system deflects the beam. The deflection systems are controlled in different manners, depending upon the mode of operation of the acquisition and tracking system, which comprise a search mode, a spiral search mode and a tracking mode. In the search mode of operation the mechanical deflection system (19), which includes one or more servo-driven scanning mirrors (54 and 56), relatively slowly sweeps the electromagnetic beam in either a line scan (18) or an area scan (16) search pattern. As the beam is swept, the acousto-optic deflection system (17) relatively rapidly moves the beam in a predetermined pattern over a relatively small field of view. When a target is acquired during the search mode, the acquisition and tracking system passes through the spiral mode of operation and enters the track mode of operation. In the track mode of operation, the acousto-optic deflection system (17) dithers the beam (14) around its central axis. If the target moves from a position lying along the central axis, the scanning mirrors (54 and 56) are repositioned such that the beam impinges on the target (12) when the beam lies along the central axis of the acousto-optic deflection system (17). In the event the target is lost, the acquisition and tracking system shifts to the spiral mode of operation. In the spiral mode of operation the beam (14) is moved in a spiral pattern by the acousto-optic deflection system (17) until the target is reacquired. If the target is not reacquired, the acquisition and tracking system returns to the search mode of operation.

30 Claims, 15 Drawing Figures

ELECTROMAGNETIC BEAM ACQUISITION AND TRACKING SYSTEM

TECHNICAL AREA

The present invention is directed to electromagnetic beam acquisition and tracking systems and, more particularly, to electromagnetic beam acquisition and tracking systems that are particularly suitable for use onboard aircraft.

In various applications there exists a need for systems having the ability to seek, acquire and subsequently track a target object moving relative to a reference platform, i.e., the target object, the reference platform or both are moving. It is also desirable that such systems be able to continuously monitor and precisely determine at any point in time the angular orientation between the reference platform (e.g., an aircraft in flight) and the target object (e.g., another aircraft or an object on the ground). Environments in which acquisition and tracking systems can be usefully employed include airborne aircraft refueling operations, docking maneuvers in space and airborne space vehicle recovery operations. Such systems also find use in the testing of military aircraft electronic systems by providing an accurate indication of the angular orientation of a target object with respect to a source of ordinance for comparison purposes.

The primary limitation of prior art convention radar and direction-finding electronic systems is their inability to provide the high angular resolution required to make accurate angle determinations. That is, while conventional radar and direction-finding electronic systems respond fast enough to track rapidly moving targets, the angular resolution provided by such systems is inadequate in many environments. Because of such disadvantages, proposals have been made to use a source of highly collimated radiation, such as that produced by a laser, in acquisition and tracking systems. In one such system the laser is mounted onboard a reference platform (e.g., an aircraft) and directed toward a retroreflector mounted on a target.

While laser acquisition and tracking systems provide angular accuracy superior to that provided by acquisition and tracking systems using radar (or more conventional optical/mechanical devices), in the past, such systems have also had disadvantages. More specifically, improved angular accuracy results are achieved with prior art acquisition and tracking systems utilizing coherent, highly collimated (e.g., laser) beams of radiation because such beams undergo negligible dispersion. In addition, laser beams have the advantage that their radiation level is high enough to enable the detection of return beam reflections from a conventional retroreflector located miles away from the source of the beam. However, while laser acquisition and tracking systems have these advantages, in the past, laser acquisition and tracking systems have not had both wide angle search capability and high-speed tracking capability. Such benefits have not been achieved because it is mechanically impossible to directly control the output direction of the laser beam itself. In order to have directional control the laser beam must be deflected. In the past, laser beam deflection in tracking and acquisition systems has been accomplished with mechanical devices. The problem with mechanical devices, such as servodriven scan mirrors, is that they cannot deflect the beam with both high speed and high accuracy. In this regard, the inertial mass of conventional mirrors and other mechanical and optical beam redirection devices severely limits the speed at which they may be moved to change the direction of a laser beam. In many instances, a significant period of settling time is required after a mechanical device has been moved from one position to the next position to change beam direction.

In order to overcome some of the foregoing disadvantages some prior art systems have proposed detecting the return beam with an electronic device having a light receiving surface that can be scanned to locate an image, such as an image dissector tube. One problem with such systems is that such detecting devices (e.g., image dissector tubes) must be carefully handled and, thus, are not suited for use in rugged environments.

By way of example, a prior art laser acquisition and tracking system having the disadvantages noted above (which limits the use of such a system) is described in U.S. Pat. Nos. 3,917,196 and 4,025,193 issued to Pond et al. These patents describe a laser acquisition and tracking system for orienting a receiving airplane with respect to a fuel tanker airplane during airborne refueling operations. More specifically, a laser beam, emitted by a source in the tanker airplane, is directed toward the receiving airplane by a pair of servo-driven azimuth and elevation scan mirrors. The tanker airplane is equipped with a retroreflector placed at the end of a fuel line trailing from the airplane. Further, the receiving airplane is equipped with a retroreflector located at its fuel receiving receptacle. Whenever the laser beam strikes the retroreflectors, it is reflected back along its path of travel and impinges on the face of an image dissector type photomultiplier tube. The direction of the retroreflector(s) with respect to the tanker airplane is approximately determined by the positions of the servo-motor shafts of the scan mirrors and somewhat more precisely determined by the position of the reflected laser beam(s) on the face of the photomultiplier tube.

While the system described in U.S. Pat. Nos. 3,917,196 and 4,025,193 has been found suitable for use in an aircraft refueling operation, it has been found that such a system is not suited for use when the target to be tracked is rapidly moving and the environment of use is rugged, such as exists onboard a high-speed military aircraft. More generally, such a system is not ideally suited for use in rugged environments requiring both wide angle search capability and high-speed tracking capability. The present invention is directed to providing a system having these capabilities.

Accordingly, it is an object of this invention to provide a new and improved electromagnetic beam acquisition and tracking system.

It is also an object of this invention to provide an electromagnetic beam acquisition and tracking system having a wide angle search capability.

It is another object of this invention to provide an electromagnetic beam acquisition and tracking system having a high-speed tracking capability.

It is a still further object of this invention to provide an electromagnetic beam acquisition and tracking system having both wide angle search capability and high-speed tracking capability and suitable for use in a rugged environment.

It is yet another object of this invention to provide an electromagnetic beam acquisition and tracking system that is particularly useful onboard a high-speed moving platform, such as a jet aircraft, to track a target whose angular orientation with respect to the platform may rapidly change.

SUMMARY OF THE INVENTION

In accordance with this invention an acquisition and tracking system that includes a source that produces a highly collimated beam of electromagnetic radiation, a mechanical deflection system, an acousto-optic deflection system and a control system for controlling the operation of the mechanical and acousto-optic deflection systems is provided. The mechanical deflection system and the acousto-optic deflection system are serial, i.e., first one system deflects the beam and, then, the other system deflects the beam. Preferably, the mechanical deflection system includes two reflector elements that are mechanically rotatable about mutually orthogonal axes over relatively wide angles. The acousto-optic deflection system includes two acousto-optic deflectors positioned so as to deflect the beam of electromagnetic radiation along two mutually orthogonal axes. Preferably, the mutually orthogonal deflection axes of the acousto-optic deflection system and the mechanical deflection system are parallel. The acousto-optic deflection system provides high-speed scanning and tracking capability over a narrow angular field of view. The combination of a mechanical deflection system, which has a relatively low-speed wide angular scanning capability, with an acousto-optic deflection system, which has a relatively high-speed scanning and tracking capability, results in an overall system that provides high-speed scanning and tracking over a relatively wide angular field of view.

The control system controls the mechanical and acousto-optic deflection systems in modes of operation that provide for the acquisition and subsequent tracking of target objects supporting retroreflectors. A retroreflector is an optical device that reflects a beam of electromagnetic radiation coaxially back along the beam's path of projection. One common type of retroreflector is a cube corner reflector. Preferably, the modes of operation of the acquisition and tracking system include a search mode of operation, a spiral search mode of operation and a tracking mode of operation. In the search mode of operation the reflector elements of the mechanical deflection system sweep the beam of electromagnetic radiation in either a line scan search pattern or an area scan search pattern. As the beam is swept by the mechanical deflection system, the acousto-optic deflection system moves the beam in a zig-zag pattern over the narrow field of view of the acousto-optic deflection system. The size of the narrow field of view of the acousto-optic deflection system and the nature of the search pattern is such that the beam sweeps a path having a sufficient width to ensure acquisition of a target that would otherwise be missed between linear sweeps of a very narrow beam. Preferably, the line scan search pattern is followed when the tracking and acquisition system of the invention is used on a high-speed moving platform, such as a jet aircraft. In this situation the beam is swept in a direction transverse to the direction of platform movement. Movement of the platform functions to continuously move the beam in the direction of platform movement. After each line scan, in one direction, e.g., from left to right, a rapid retrace occurs in the opposite direction (e.g., from right to left) prior to the next scan. Contrariwise, when the tracking and acquisition system of the invention is mounted onboard a relatively slow moving platform, or the platform is located at a fixed position, the search mode of operation follows the area scan search pattern. In this case, the mechanical deflection system moves the beam back and forth in a zig-zag pattern of overlapping scan lines.

When the emitted electromagnetic beam strikes a retroreflector, a return signal detection system detects the reflected beam and the acquisition and tracking system shifts from the search mode of operation to the tracking mode of operation. In the tracking mode of operation, the mechanical deflection system is controlled in a manner that seeks to maintain the beam centered in the acousto-optic deflection system when impinging on the target retroreflector. The beam is maintained centered by dithering it around the target location in a predetermined pattern. At selected points in the dither pattern, tests are made to determine whether or not the target is moving. The detection of such movement causes the scan mirrors of the mechanical deflection system to be repositioned such that the beam is moved toward the center of the acousto-optic deflection system when the beam is impinging on the target. In essence, the degree of acousto-optic beam deflection away from the center axis of the acousto-optic deflection system is employed in a feedback manner to drive the mechanical deflection system in a follow-up manner that brings the acousto-optic deflection beam back to the center axis position.

In the event the target is lost, i.e., moves far enough away from the center axis of the acousto-optic deflection system that it cannot be followed based on the information developed as the beam is dithered, the acquisition and tracking system shifts to the spiral search mode of operation. The spiral search mode of operation provides for the quick reacquisition of a momentarially lost target by deflecting the electromagnetic beam outwardly in a spiral search pattern in the narrow field of view of the acousto-optic deflection system. If the target is reacquired while the acquisition and tracking system is in the spiral mode of operation, the system returns to the track mode of operation. Alternatively, if the target is not reacquired while the acquisition and tracking system is in the spiral mode of operation, the system shifts to the search mode of operation.

Preferably, the source of electromagnetic radiation is a laser. The high intensity, coherency and low beam divergence of a laser beam renders a laser source of electromagnetic radiation distinctly superior to other sources of electromagnetic radiation. Most preferably, the frequency of the laser lies in the visible range of the electromagnetic spectrum, whereby the reflector elements of the mechanical deflection system can take the form of scan mirrors and a photomultiplier tube can be used to detect the return beam.

In accordance with another aspect of this invention, the laser beam is bent through an angle of 90° by a small mirror or prism prior to leaving the platform. The small mirror or prism is sized such that it intersects all of the emitted laser beam and only a small portion of the return beam, which is enlarged due to divergence. Thus, the majority of the return beam passes around the small mirror. The return signal detection system includes an annular filter and lens system that collects the return beam after it passes around the small mirror and images the collected light onto the light receiving surface of the photomultiplier tube. This configuration eliminates the need for a beam splitter or other conventional apparatus for separating coaxial incoming and outgoing beams. This configuration of the invention also offers the advantage of not requiring offset outgoing and return beam optical systems. The latter systems have the disadvantage of requiring constant attention in order to maintain bore sight alignment between the transmitting and receiving optics. The common optical centerline arrangement of a coaxial system avoids this problem.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
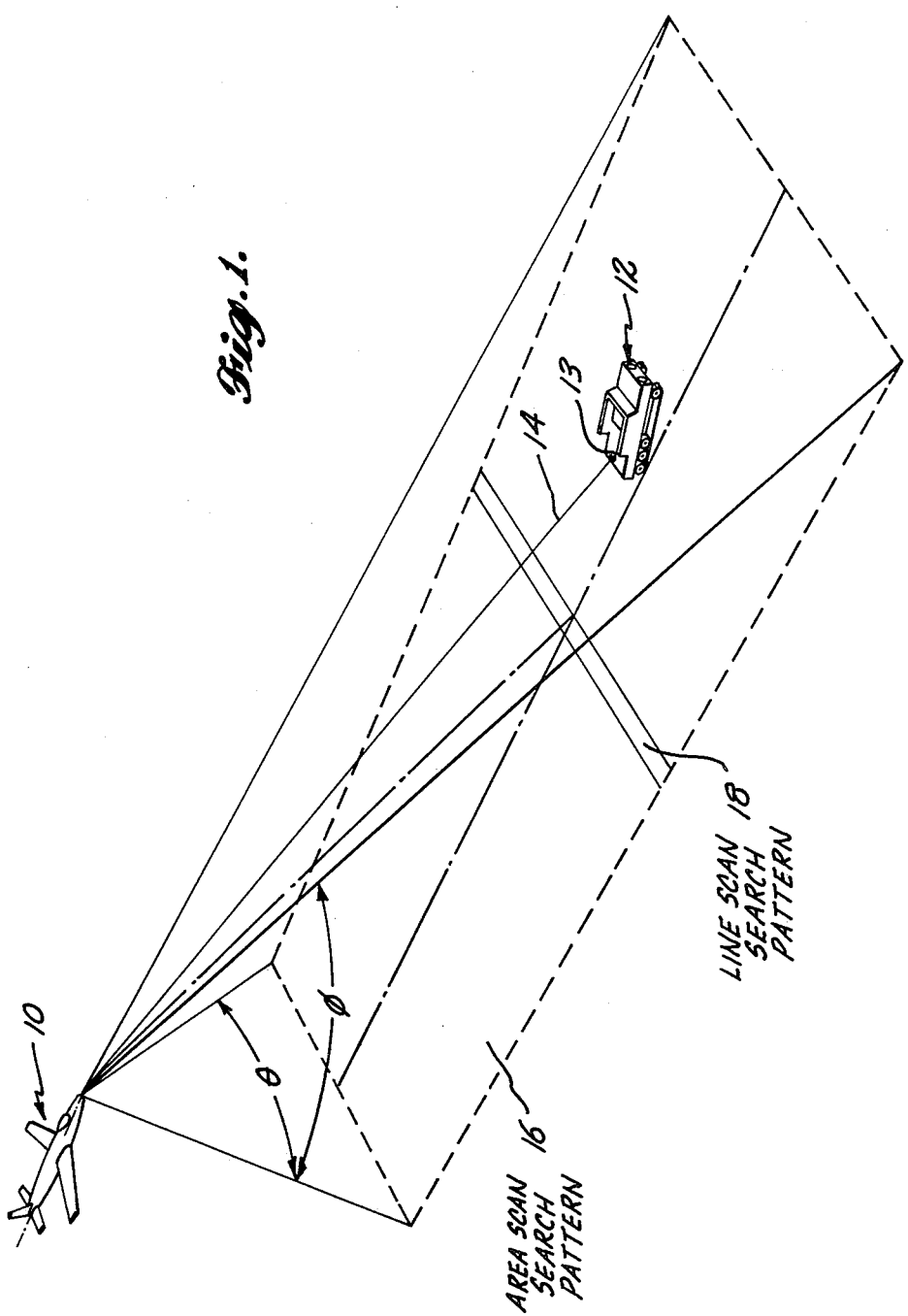
FIG. 1 is a pictorial illustration of an acquisition and tracking system formed in accordance with the invention mounted in the nose of an airplane and positioned to track a vehicle on the ground supporting a retroreflector, and includes an outline of both a line scan search pattern and an area scan search pattern.

FIG. 1 illustrates an acquisition and tracking system, formed in accordance with the present invention, mounted in a jet aircraft 10 for acquiring and subsequently tracking a target object on the ground, illustrated as a vehicle 12. Mounted on the vehicle is a retroreflector 13. Briefly, in accordance with the invention, a laser beam 14 is projected from the airplane 10 toward the ground. Preferably, as illustrated, the beam is oriented in the direction of aircraft movement. Thus, the beam impinges on the ground ahead of the aircraft. As discussed in greater detail below, the laser beam 14 either scans the ground (search mode of operation) or follows a target (track mode of operation). The search mode of operation may take different forms. In one form, the laser beam 14 is swept in a line scan search pattern over the ground ahead of the aircraft, as illustrated by the line 18 in FIG. 1. In an alternative mode of operation, the laser beam 14 is swept in a zig-zag manner back and forth over an area 16 (area search scan pattern). The area search when the area search scan pattern is followed is defined by an azimuthal angle and an elevational angle centered at the nose of the airplane 10. By way of example only, the azimuthal angle may equal 20 degrees and the elevational angle may equal 50 degrees.

Figure 2:
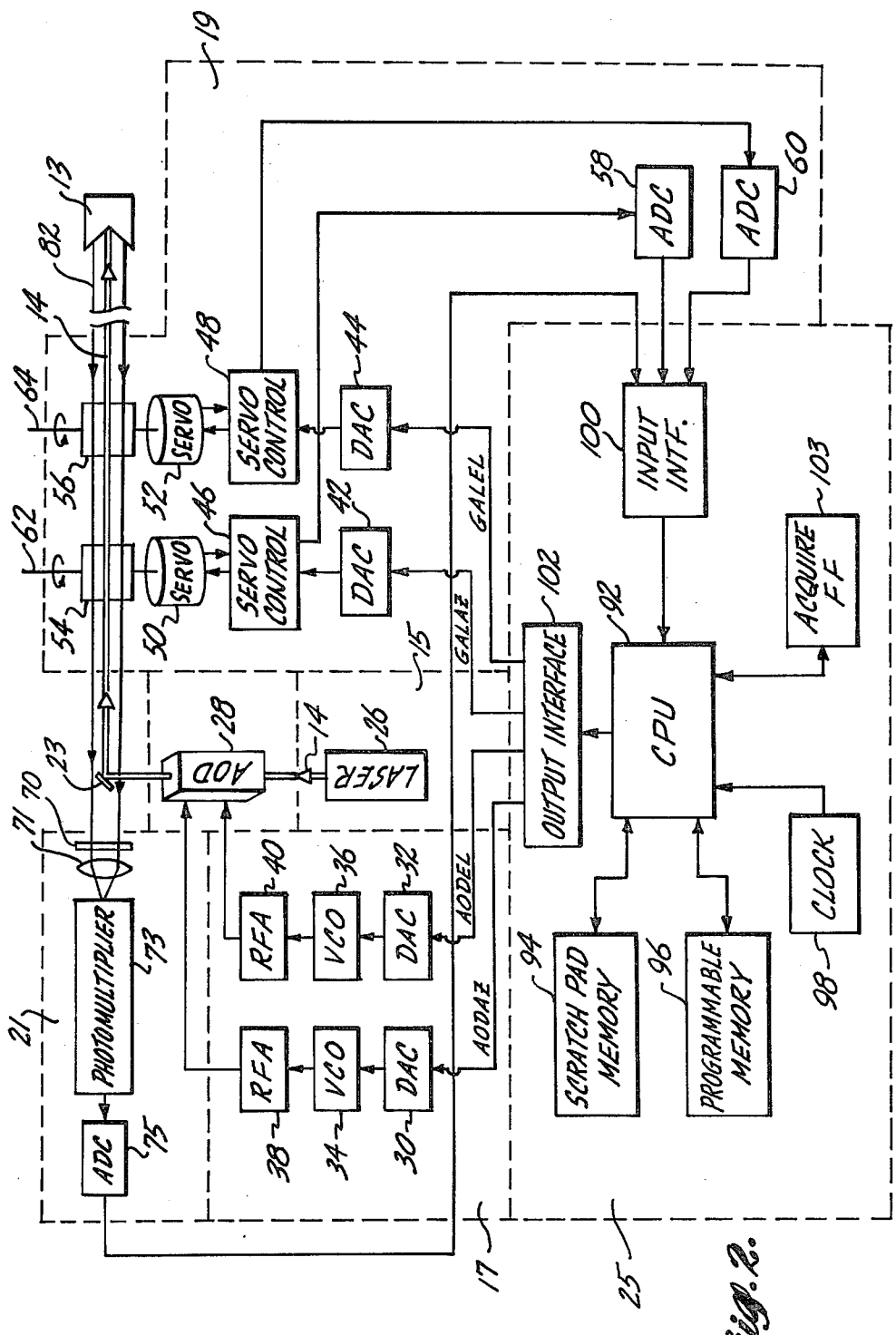
FIG. 2 is a partially pictorial and partially block diagram of an acquisition and tracking system formed in accordance with the invention.

FIG. 2 illustrates a preferred embodiment of an acquisition and tracking system formed in accordance with the invention and comprises: a source of a beam of electromagnetic energy 15; an acousto-optic deflection system 17; a mechanical deflection system 19; a return beam detection system 21; an optical separator 23; and, a controller 25.

The source of a beam of electromagnetic energy 15 comprises a laser 26. The direction of the laser beam 14 is controlled by the acousto-optic deflection system 17 and the mechanical deflection system 19 so as to impinge on the retroreflector 13, which is mounted on a target, as previously described.

The acousto-optic deflection system 17 comprises: a two-axis acousto-optic deflector (AOD) 28, positioned to receive the laser beam 14; first and second AOD digital-to-analog converters (DACs) 30 and 32; first and second voltage controlled oscillators (VCOs) 34 and 36; and, first and second radio frequency amplifiers (RFAs) 38 and 40. The two deflection axes of the AOD are orthogonal and are here defined as the azimuthal (AZ) and elevational (EL) axes. Further, the first AOD DAC 30, the first VCO 34 and the first RFA 38 form a first channel that applies control signals to the AZ axis deflection control input of the AOD. Similarly, the second AOD DAC 32, the second VCO 36 and the second RFA 40 form a second channel that applies control signals to the EL axis deflection control input of the AOD 28. More specifically, the first and second AOD DACs 30 and 32 receive AZ and EL axis control signals, hereinafter denoted AODAZ and AODEL, respectively, from the controller 25. The output of the first AOD DAC 30 is connected to the input of the first VCO 34 and the output of the second AOD DAC 32 is connected to the input of the second VCO 36. Further, the output of the first VCO 34 is connected to the input of the first RFA 38; and, the output of the second VCO 36 is connected to the input of the second RFA 40. Finally, the outputs of the RFAs are connected to the AZ and EL axis control inputs of the AOD 28, respectively, as previously described.

As will be readily appreciated by those familiar with AODs, an AOD controls the deflection of the laser beam in accordance with Bragg diffraction principles. Since the AOD used by the present invention is a two axis AOD, it includes two deflectors each deflecting the laser beam 14 along one axis. Each of the single axis deflectors includes an interaction cell or crystal. When suitable high frequency sound waves are applied to a control input of one of the AOD cells or crystals and a laser beam is passing through the cell along a suitable axis, the beam is deflected. The angle of deflection is related to the frequency of the high frequency sound waves. As the frequency is increased the beam is deflected away from a central axis position.

By way of example, one acousto-optic deflector (AOD) used in an actual embodiment of the invention is the Model LD401 produced by the Isomet Corporation of Springfield, Va. While the LD401 acousto-optic deflector has a maximum deflection range of the order of 50 milliradians, in the actual embodiment of the invention using the LD401 acousto-optic deflector, a 14 milliradian deflection range in both azimuth and elevation was selected to ensure search and track operation under all reasonably foreseeable flight speeds and conditions of the aircraft in which the embodiment was to be mounted. The full 50-milliradian deflection range or field of view of the LD401 was not used because a deflection of this magnitude requires opening up the field stop aperture of the return beam detection system 21 (discussed below) to large entry angles, with a resultant increase in undesired background radiation (e.g., noise).

The mechanical deflection system 19 illustrated in FIG. 2 comprises: first and second galvanometer (GAL) digital-to-analog converters (DACs) 42 and 44; first and second servo-controllers 46 and 48; first and second servo motors 50 and 52; first and second scan mirrors 54 and 56; and, first and second galvanometer (GAL) analog-to-digital converters (ADCs) 58 and 60. The first and second servo-controllers 46 and 48 and the first and second servo motors 50 and 52 form first and second galvanometer positioning systems, respectively. The first and second galvanometer systems position the first and second scan mirrors 54 and 56, one of which is mounted on the shaft of each of the servo motors. The rotational axes of the servo motors 62 and 64 are orthogonal and are positioned such that one scan mirror sweeps the laser beam in the azimuthal plane, as defined by the AOD, and the other scan mirror sweeps the laser beam in the elevational plane, as also defined by the AOD. In this regard, the first scan mirror 54 is hereinafter defined as the azimuthal (AZ) scan mirror and the second scan mirror 56 is hereinafter defined as the elevational (EL) scan mirror. Further, the first DAC 42, the first servo-controller 46, and the first servo motor 50 of the mechanical deflection system form an azimuth channel that controls the position of the AZ scan mirror 54; and, the second DAC 44, the second servo-controller 48, the second servo motor 52 of the mechanical deflection system form an elevational channel that controls the position of the EL scan mirror 56. More specifically, the first and second GAL DACs 42 and 44 receive control signals, hereinafter denoted GALAZ and GALEL, respectively, from the controller 25. The outputs of the first and second GAL DACs 42 and 44 are connected to the command inputs of the first and second servo-controllers 46 and 48, respectively. The first and second servo-controllers 46 and 48 apply position control signals to the control inputs of the first and second servo motors 50 and 52, respectively. The first and second servo motors 50 and 52 include position sensors that control the state or nature of position signals. The position signals are fed back to the associated servo-control systems 46 and 48. Thus, the first and second servo-controllers 46 and 48 are adapted to control the position of the shafts of the first and second servo motors 50 and 52 in a closed loop feedback manner, respectively. That is, the command inputs are compared with the position signals by the servo controllers 46 and 48. The results of the comparisons are used to control the positions of the shafts 62 and 64 of the servo motors.

The position signals developed by the first and second servo-controllers 46 and 48 are applied to the inputs of the first and second GAL ADCs 58 and 60, respectively. Thus, the first GAL ADC 58 forms an azimuth (AZ) GAL ADC and the second GAL ADC 60 forms an elevation (EL) GAL ADC.

Figure 3:
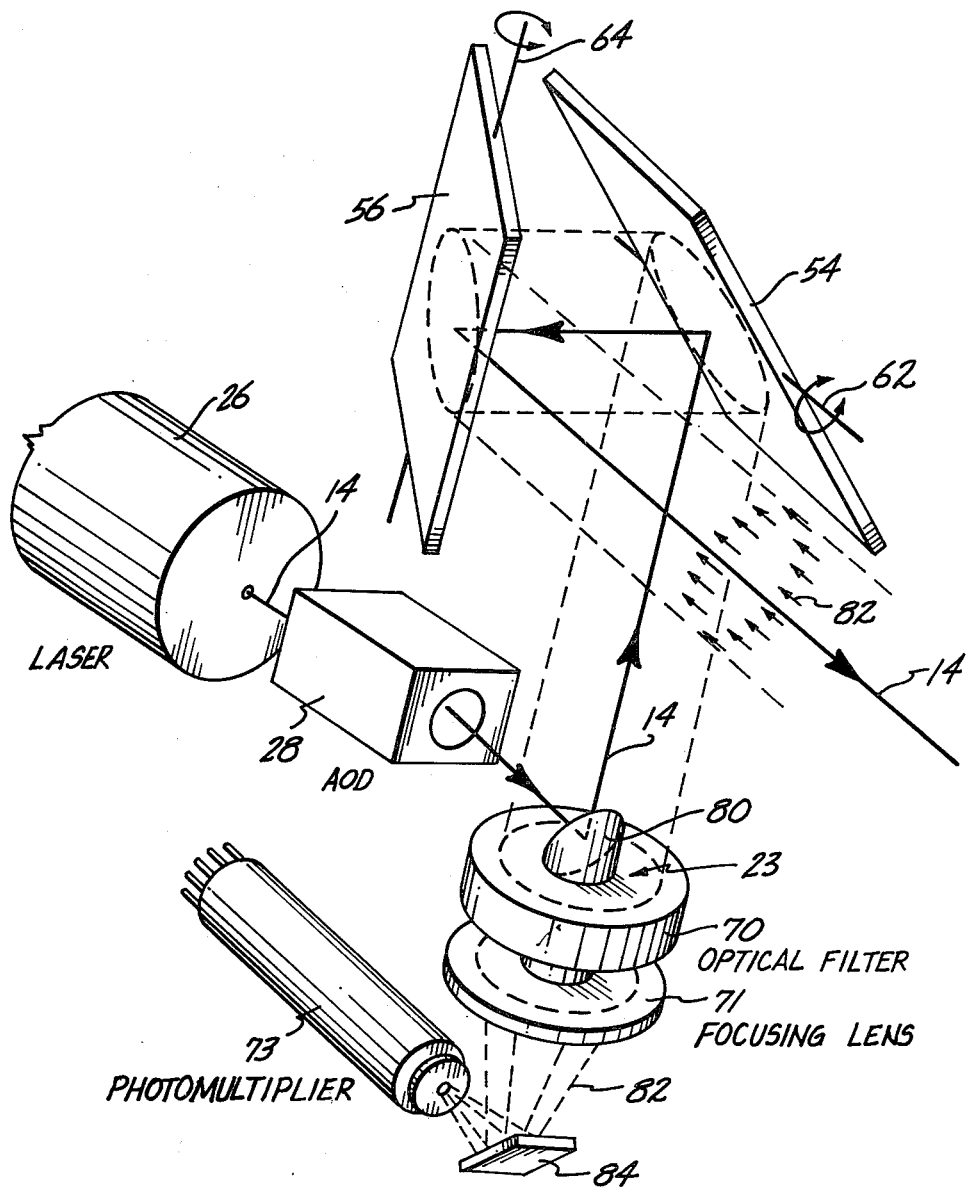
FIG. 3 is a pictorial diagram of the major optical and mechanical elements of an acquisition and tracking system formed in accordance with the invention.

As illustrated in FIGS. 2 and 3, the return beam detection system 21 comprises: an optical filter 70; a focusing lens 71; a photomultiplier 73; and an analog-to-digital converter (ADC) 75. As illustrated in FIG. 3, preferably, the light separator 23 comprises a small mirror 80.

As best illustrated in FIG. 3, the laser beam 14 first passes through the AOD 28 and then impinges on the small mirror 80. The small mirror 80 functions to separate the coaxial outgoing and returning beams. More specifically, the small mirror 80 is mounted at a 45-degree angle with respect to the central axis of the AOD 28. Thus, the small mirror 80 bends the laser beam by 90 degrees. The thusly bent beam intersects the AZ scan mirror 54, which directs the beam toward the EL scan mirror 56. The EL scan mirror directs the beam outwardly from the platform on which the acquisition and tracking system of the invention is mounted. The return beam correspondingly first impinges on the EL scan mirror 56, which directs the beam toward the AZ scan mirror 54. The AZ scan mirror directs the beam toward the small mirror 80. The major portion of the return beam 82 (which is larger in diameter than the outgoing beam due to divergence) passes around the small mirror and is filtered by the optical filter 70. The filtered beam is focused by the focusing lens 71 onto the face of the photomultiplier tube 73. If desired, a mirror 84 may be mounted between the focusing lens 71 and the face of the photomultiplier tube 73 to fold or redirect the light onto the face of the photomultiplier tube 73.

While the controller 25 can take on various forms, preferably, it is in the form of a programmed data processor that includes, as generally illustrated in FIG. 2, conventional components such as: a central processing unit (CPU) 92; a scratch pad memory 94; a programmable memory 96; a clock 98; an input interface 100; and, an output interface 102. The CPU 92 receives instructions from the programmable memory 96; the clock 98 provides timing pulses to the CPU (and other circuitry, as required); and, the scratch pad memory 94 provides a memory for temporarily storing data as it is being manipulated by the CPU 92. The input interface 100 is connected to and receives the digital signals from the GAL ADCs 58 and 60 of the mechanical deflection system 19 and the ADC 75 of the return beam detection system 21. The output interface 102 is connected to and applies the AODAZ, AODEL, GALAZ and GALEL digital command signals (produced by the CPU) to the AOD DACs 30 and 32 and to the GAL DACs 42 and 44, respectively.

While various types of data processing systems can be utilized to form the controller 25, in one actual embodiment of the invention, the controller was based on the Intel 3000 Series Microcomputer System produced by the Intel Corporation of Santa Clara, Calif. and included a 16-bit CPU formed of an array of eight 2-bit Intel 3002 central processing elements (CPEs), a programmable memory formed by ten Intel 3625 4K programmable read only memories (PROMs) and a scratch pad memory formed of four Intel 2114-2 4K static random access memories (RAMs). In addition to these items, the CPU was supported by an Intel 3001 microprogram control unit (MCU); a look-up table formed of four Intel 2716 16K UV (ultraviolet) erasable programmable read only memories (EPROMs) (in which semi-permanent calibration data was stored); and, other required items all of which are described in the Component Data Calalog published by Intel Corporation (1978). In addition to conventional elements such as C and Z flag flip-flops (not shown in FIG. 2), the controller 25 also includes an acquire flip-flop 103 that is set when a target is acquired.

The Intel 3000 Microcomputer System was selected for one actual embodiment of the invention because the operative speed of the CPU of this system is generally 10 to 50 times faster than the operational speed of the majority of other microprocessors currently available. A 16-bit word width was selected as adequate for the degree of numerical precision required by the environment in which this embodiment of the invention was to be used, specifically onboard an aircraft.

Figure 4:
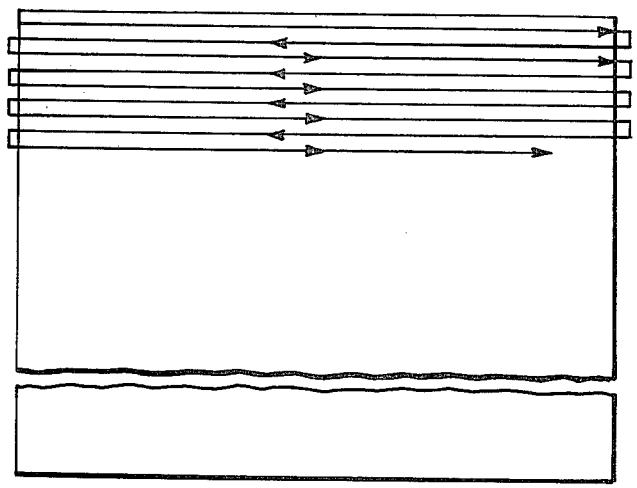
FIG. 4 is a pictorial diagram illustrating an area search scan pattern.

In accordance with the invention, the controller controls the acousto-optic and mechanical deflection systems in three different modes of operation—a search mode of operation; a spiral search mode of operation; and, a tracking mode of operation. Depending upon the speed of movement of the platform on which the acquisition and tracking system of the invention is to be utilized, and other pertinent parameters, the search mode of operation can follow either a line scan search pattern or an area scan search pattern. When the line scan search pattern is followed, the beam is continuously moved in an azimuthal line scan manner by the mirror 54 of the mechanical deflection system 19, the EL scan mirror, remaining fixed. After each scan line is completed, the AZ scan mirror rapidly returns to the start end of the line and a new line is scanned. Rather than utilizing the EL scan mirror 56 to change the elevational position of the scan at the end of each azimuthal scan line, elevational positioning of the azimuthal scan lines is produced by the movement of the platform (e.g., aircraft) on which the acquisition and tracking system is mounted. Contrariwise, when the area scan search pattern is followed, both the EL and the AZ scan mirrors are moved. More specifically, the AZ scan mirror moves the beam in zig-zag manner. In this regard, scanning occurs in both directions, rather than in one direction followed by a non-scanning retrace. Prior to each scan reversal the EL scan mirror is stepped. The resulting scan pattern is illustrated in FIG. 4. Preferably, the EL scan mirror steps are equal to one-half of the elevational dimension of the AOD field of view. Thus, if the elevational dimension of the AOD field of view is 14 milliradians, each EL scan mirror step is 7 milliradians. Obviously, other step increment sizes can be chosen depending upon the speed of movement of the platform on which the acquisition and tracking system is mounted. The criteria to be met by the step increment size is that the azimuthal AOD scans overlap so that all regions of the area being searched are covered.

Regardless of whether the search pattern is a line scan search pattern or an area scan search pattern, as the beam is moved in the azimuthal direction by the AZ scan mirror 54, the AOD sweeps the beam over its field of view. The preferred sweep pattern followed by the AOD during the search mode of operation is described below in connection with a description of the flow diagrams illustrating the operation of the controller 25, which are next described.

Figure 5:
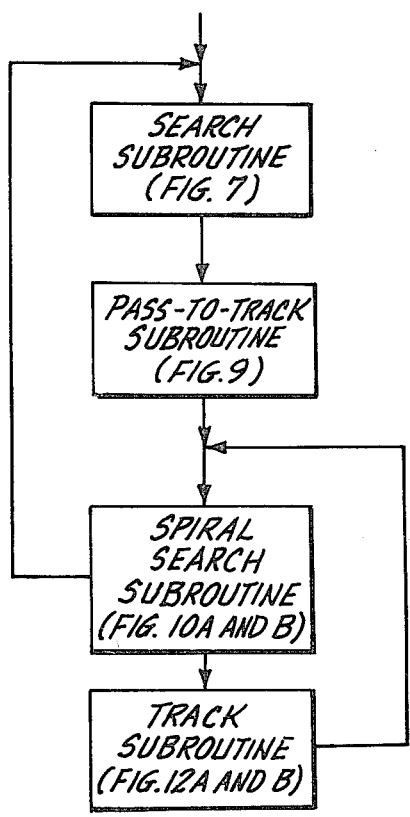
FIG. 5 is a block diagram illustrating the major modes of operation and the paths therebetween of the CPU of the acquisition and tracking system illustrated in FIG. 2.

As illustrated in FIG. 5, initially, the controller 25 follows a search subroutine. As discussed above, the search subroutine can control the acquisition and tracking system such that a line scan search pattern or an area scan search pattern is followed. Once a target is located (e.g., acquired), the search subroutine ends and the controller follows a pass-to-track subroutine, which corrects for certain galvanometer errors, hereinafter described. After the pass-to-track subroutine has been completed, the controller passes through a spiral search subroutine and, then, follows a track subroutine. The track subroutine causes the controller to position the AZ and EL scan mirrors 54 and 56 in a manner that seeks to maintain the laser beam 14 centered in the AOD 28, when the photomultiplier receives the maximum amount of return beam energy, which means that the beam is centered on the target. In other words, the scan mirrors 54 and 56 are controlled in a manner that seeks to maintain the beam both centered on the target retroreflector 13 and centered in the AOD. If the target 12 is lost, the track subroutine ends and the controller shifts to the spiral search subroutine. In the spiral search subroutine, the controller scans the field of view of the AOD in a spiral pattern in an effort to rapidly relocate the target 12. If the target is not relocated, the controller returns to the search subroutine.

Figure 6:
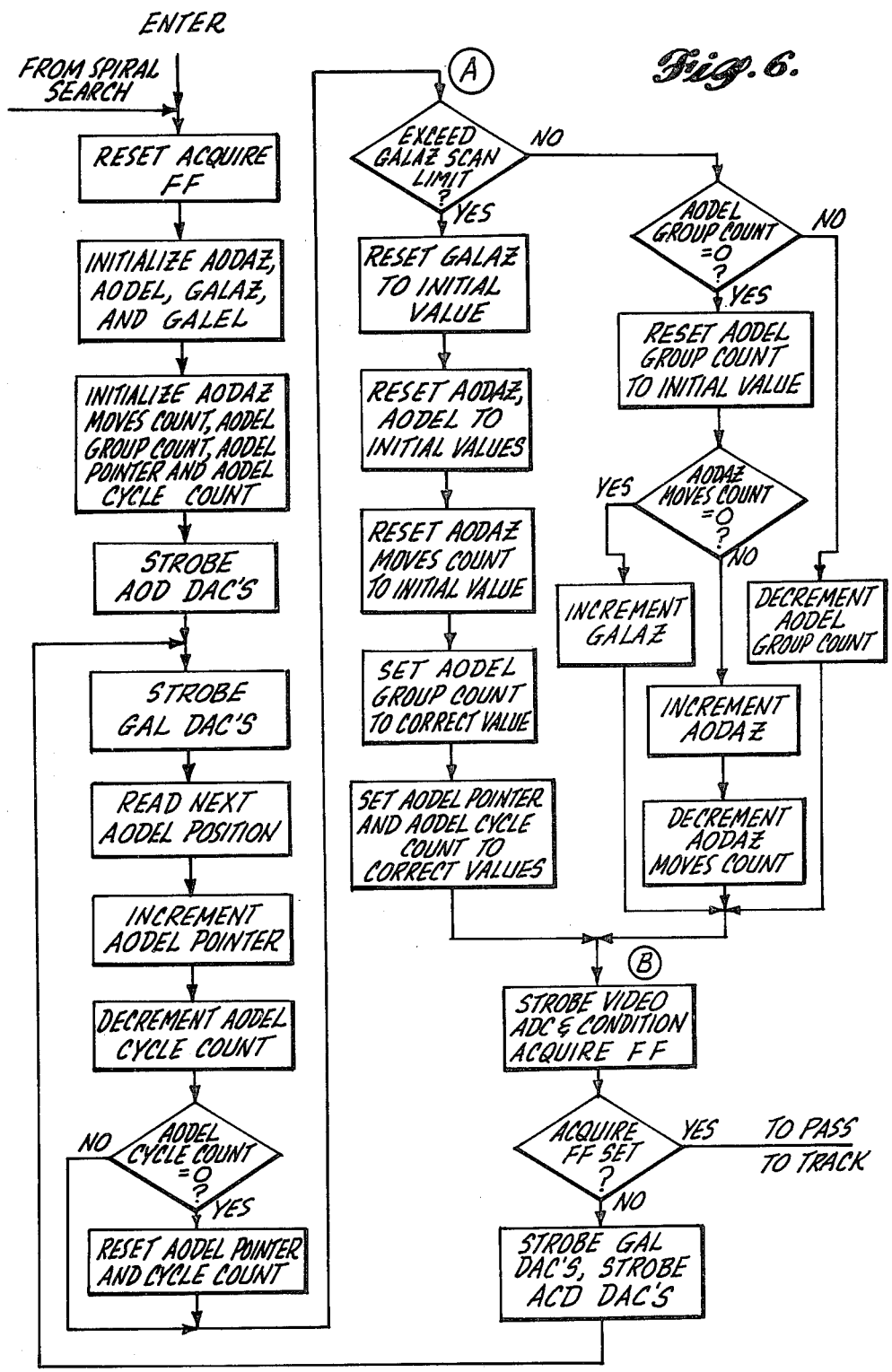
FIG. 6 is a flow diagram illustrating a search subroutine suitable for use in FIG. 5.

FIG. 6 illustrates a search subroutine formed in accordance with the invention for creating a line scan search pattern. The search subroutine is entered either after the controller is initialized or when a target is lost and not relocated during the spiral search subroutine, as previously described. The first step in the search subroutine illustrated in FIG. 6 is to reset the acquire flip-flop 103. The next step is to initialize the azimuthal and elevational positions of the AOD and the scan mirrors. For purposes of this description, the azimuthal laser beam position in the AOD is herein denoted AODAZ; the elevation laser beam position in the AOD is denoted AODEL; the pointing direction of the galvanometer AZ scan mirror 54 is denoted GALAZ; and, the pointing direction of the galvanometer EL scan mirror 56 is denoted GALEL. The control signals applied to the four DACs illustrated in FIG. 2 for controlling the AOD and scan mirrors are, as discussed above, correspondingly denoted AODAZ, AODEL, GALAZ and GALEL control signals. For purposes of description only it is herein assumed that the scanning direction of the line scan search pattern to be followed by the search subroutine illustrated in FIG. 6 is from left to right. As a result, GALAZ is initialized to its leftmost position. Also, since a line scan search pattern is being followed the GALEL position is fixed. AODAZ and AODEL are positioned in the upper center position of the field of view of the AOD, as illustrated by letter a in FIG. 7.

The AOD scan pattern is controlled by counting various items and changing the AOD azimuth and elevation positions when certain count values are reached. The result is a pattern of the type illustrated in FIG. 7, which comprises four spaced elevational positions at the same azimuthal position followed by both an elevational and an azimuthal position change. More specifically, starting at the top, middle of the AOD field of view illustrated in FIG. 7 (denoted by the letter a), the beam is stepped downwardly. The beam starting position is denoted by the numeral 1 and the beam is stepped three times through positions 2 and 3 to position 4. These four positions define a group of moves in the illustrated embodiment of the invention. Next, the beam is stepped one step in the azimuth direction (to the right) and one step down in the elevational direction to position 5. Thereafter three elevational steps take place through positions 6 and 7 to position 8. Next, another step to the right and one down take place to position 9. After three more vertical steps (positions 10, 11 and 12) another step to the right and one down (to position 13) takes place. Then two down steps (positions 14 and 15) take place. At this point the beam is at the bottom of the AOD field of view illustrated in FIG. 7. Rather than stepping down the next move of the beam is a retrace to position 16 at the top of the AOD field of view. Azimuthally position 16 is aligned with positions 13, 14 and 15. At this point a cycle of the AOD search scan pattern is complete. The beam is next stepped one step to the right to new position 1. Thereafter a second cycle takes place. The AOD search scan pattern continues thereafter in this manner.

Initially, no GALAZ movement occurs, i.e., the azimuth scan mirror is in a fixed position. GALAZ movement starts after the AOD search scan pattern has moved a certain number of steps or moves in the azimuthal direction. In the illustrated embodiment of the invention the number of moves is 17 and occurs between positions 4 and 5 of the fifth cycle. This position is denoted the GALAZ MOVEMENT STARTS position in FIG. 7. In summary, the illustrative scan pattern shown in FIG. 7 includes an AODAZ moves count of seventeen (17), an AODEL group count of four (4) and an AODEL cycle count of sixteen (16). Obviously, other values can be used. In addition to AODAZ moves count, AODEL group count and AODEL cycle count values, the invention requires the development of AODEL pointer values. The AODEL pointer values relate to the positions in memory that define the sixteen (16) AODEL cycle count positions. That is, there are sixteen memory pointer positions, one for each cycle position.

Figure 7:
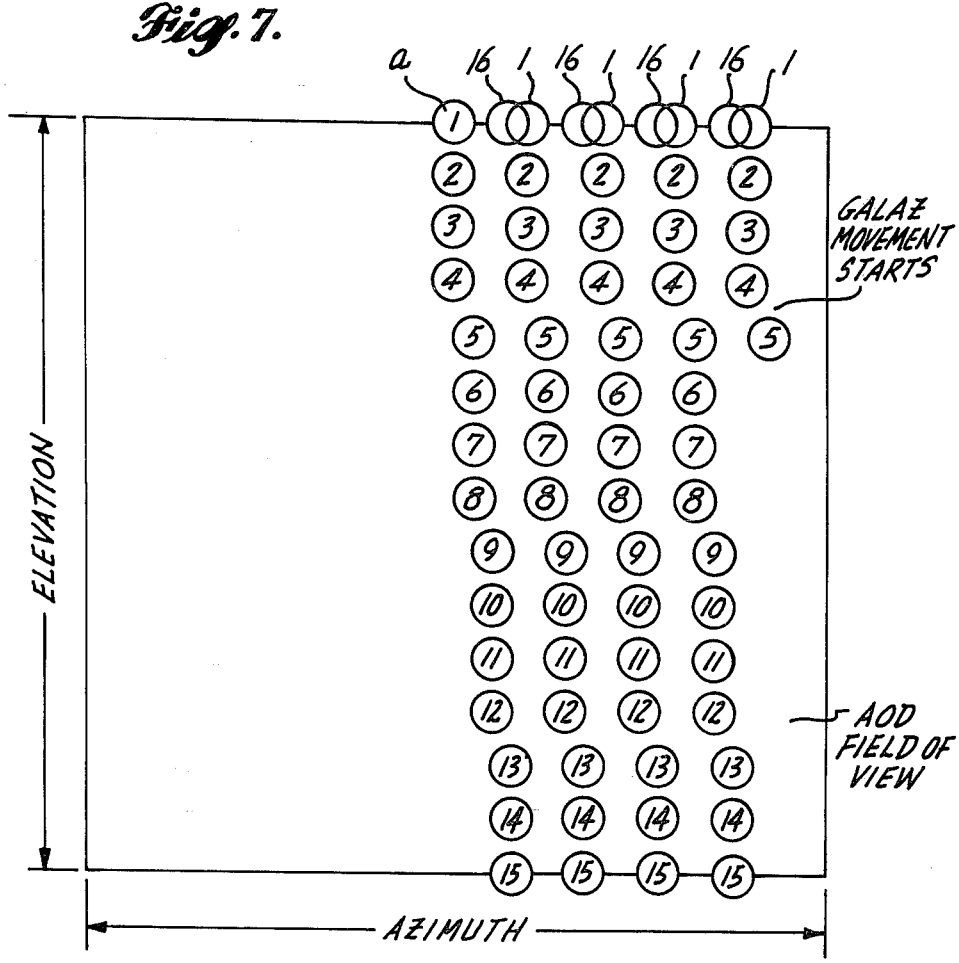
FIG. 7 illustrates the acousto-optic deflection system scan pattern when the search subroutine illustrated in FIG. 6 is followed.

Returning to FIG. 6, after the AODAZ moves count, AODEL group count, AODEL pointer and AODEL cycle count values have been initialized, a strobe signal is applied to the AOD DACs 30 and 32. As a result, the AOD moves the beam to its start position in the upper center of the AOD field of view. The next step is to strobe the scan mirror of GAL DACs 42 and 44 which causes the scan mirrors to be moved to their initial position. Assuming, as illustrated in FIG. 7, the line scan search pattern is from left-to-right, the AZ scan mirror is moved to its leftmost position, while the EL scan mirror is maintained at its fixed position. (For reasons that will be understood from the following description the AODEL pointer value is initialized to the second position, i.e., position 2 in FIG. 7.)

It is pointed out that while the servo motors require that a setting period of time elapse after each step, before the next program step takes place, such settling times are not illustrated in FIG. 6 or the other flow diagrams, for reasons of drawing simplicity. However, it is understood that adequate settling times are to be provided when and where required. Also, if the AOD DACs or the ADCs in an actual embodiment of the invention require settling times after being strobed, such times are allowed to elapse before the next step in the related subroutine takes place.

Returning again to FIG. 6, after the GAL DACs have been strobed, the next AODEL position is read from memory based on the AODEL pointer value, which was initialized to the second position, i.e., position 2 in FIG. 7. The next step is to increment the AODEL pointer value. As a result, the next time a pass is made through the previous step, a new AODEL position will be read from memory, namely position 3. Following the incrementing of AODEL pointer value, the AOD cycle count is decremented. Thus, if the cycle count started out at sixteen (16), as discussed above, it is decremented to fifteen (15). After the AODEL cycle count has been decremented, a test is made to determine whether or not the AODEL cycle count is equal to zero. If it is equal to zero, the AODEL pointer value and cycle counts are reset to their initial values. If the cycle count is not equal to zero, the reset step is bypassed.

Next, a test is made to determine whether or not the GALAZ value exceeds the limit of the azimuth scan mirror, i.e., in a left-to-right scan, a test is made to determine whether or not the AZ scan mirror has been moved beyond the right limit of the scan line. If GALAZ value does not exceed the scan limit, a test is made to determine whether or not the AODEL group count value is equal to zero. If the AODEL group count is not equal to zero, the AODEL group count value is decremented by one. Thereafter, the output of the ADC 75 of the return beam detector 21 is strobed and the acquire flip-flop is conditioned. If the ADC output is above the target level, the acquire flip-flop is set. If below the target level the reset state of the acquire flip-flop is not changed. Next, a test is made to determine whether or not the acquire flip-flop was set. If the acquire flip-flop was set, the controller moves to the pass-to-track subroutine illustrated in FIG. 9 and described below. If the acquire flip-flop was not set, the GAL and AOD DACs are all strobed and the beam is moved to the next position in the AOD field of view.

If the AODEL group count value is found equal to zero, rather than decrementing the AODEL group count value as just described, the AODEL group count value is reset to its initial value, i.e., four (4) in the exemplary embodiment of the invention herein described. Then, a test is made to determine whether or not the AODAZ moves count value is equal to zero. If the AODAZ moves count value is not equal to zero, indicating that the GALAZ movement should not yet start, the AODAZ position is stepped (i.e., incremented) and the AODAZ moves count value is decremented by one. Then the previously described sequence of steps of strobing the video ADC, conditioning the acquire flip-flop, testing the acquire flip-flop, etc. occur. If the GAL and AOD DACs are strobed the beam is moved to the next position.

When the AODAZ moves count value is found to be equal to zero, meaning that AZ scan mirror movement (i.e., GALAZ movement) should begin, the GALAZ value is incremented. Then, the previously described steps of strobing the video ADC, etc. occur. If the GAL and AOD DACs are strobed the beam is moved to the next position, discussed above and illustrated in FIG. 7.

When the AZ scan mirror limit is exceeded, the AZ scan mirror position is returned to its initial position by resetting GALAZ to its initial value. In the case of a left-to-right scan, this means that the AZ scan mirror returns to its leftmost position during a "retrace" step. Thereafter, AODAZ and AODEL are reset to their initial values (upper center position in FIG. 7). Also, the AODAZ moves count is reset to its initial value. Further, the AODEL group count is set to the correct value. In this regard, since the AODEL pointer was incremented, the AODEL group count value starts at three (3), rather than four (4). Similarly, the AODEL pointer and AODEL count values are set to their correct values, which are one greater than the initial values because the AODEL pointer position value was incremented prior to the decision that the GALAZ scan limit had been exceeded.

In summary, the line scan starts with the AZ and EL scan mirrors being in a fixed position. Initially, the AOD positions the beam at the upper center of the AOD field of view. After a portion of the AOD field of view (in the scan direction) has been scanned, movement of the AZ scan mirror commences. Thereafter, each time the AODEL group value decreases to zero the AZ scan mirror is stepped and the AODEL group value is reset to its initial value of four (4). This action continues until the end of the scan line is reached. Thereafter, the various values are reset to the correct values and another line scan occurs.

Figure 8:
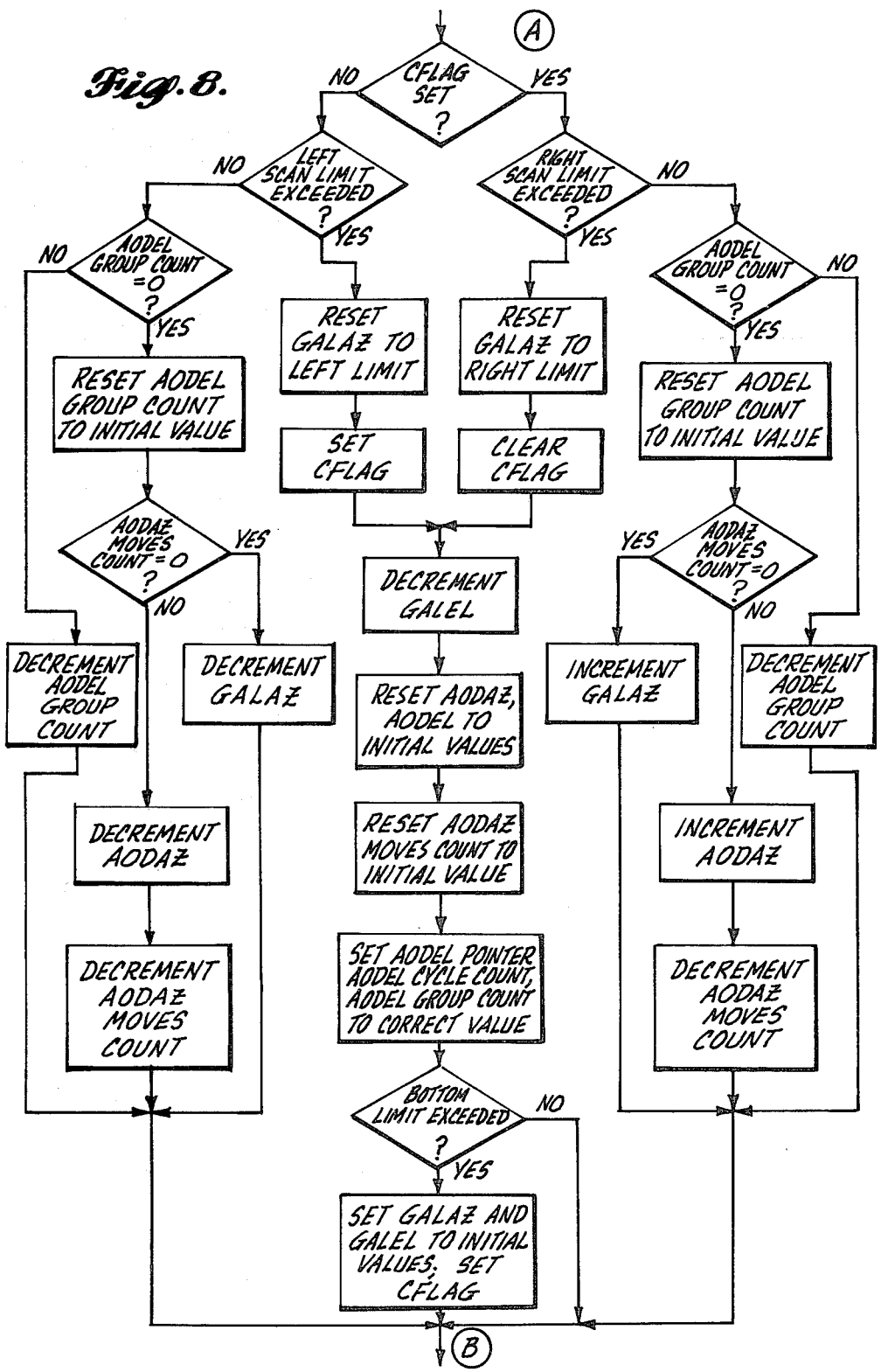
FIG. 8 is a modification of a portion of the search subroutine illustrated in FIG. 6.

FIG. 8 illustrates a modification of the flow diagram illustrated in FIG. 6 for use when an area scan search pattern is to be followed. Specifically, the portion of the flow diagram identified by the circled letters A and B in FIG. 6 is replaced by the flow diagram illustrated in FIG. 8. In addition to this change, a flip-flop identified as the CFLAG flip-flop is conditioned to an initial state during the initialization steps illustrated in FIG. 6 and heretofore described. If the initial scan is to be from left-to-right, the CFLAG flip-flop is initially set. Contrariwise, if the initial scan is to be from right-to-left the CFLAG flip-flop is initially cleared.

The first step illustrated in FIG. 8 is to test the output of the CFLAG flip-flop to determine whether or not it is set (output equals one) or clear (output equals zero). If the CFLAG flip-flop is found to be set, a test is made to determine whether or not the right limit has been exceeded. If the right scan limit has not been exceeded, right movement scan steps identical to those illustrated on the right side of FIG. 6 and heretofore described are followed. Since these steps have previously been described, they will not be redescribed here.

If the right scan limit has been exceeded, GALAZ (and, thus, the AZ scan mirror when the GALAZ DAC 42 is next strobed) is reset to the right limit value. Next the CFLAG flip-flop is cleared. Then the GALEL value is decrement, whereby when the GALEL DAC 44 is next strobed the EL scan mirror 56 is stepped down. Thereafter, AODAZ and AODEL are reset to their initial values. Further, the AODAZ moves count is reset to its initial value, seventeen (17) in the illustrated examples of the invention. Then, the AODEL group count, AODEL pointer and AOD cycle count values are set to the correct numbers, which is one away from their initial values because these values were incremented or decremented as required prior to a decision being made that the right scan limit had been exceeded. Thereafter, a test is made to determine whether or not the bottom limit of the scan area has been exceeded. If it has not been exceeded, the sequence moves to the strobe video ADC, condition acquire flip-flop, etc. steps illustrated in FIG. 6 and previously described. Contrariwise, if the bottom limit has been exceeded, the AZ and EL scan mirrors are returned to their initial positions and the CFLAG flip-flop is set, prior to the strobe video ADC, condition acquire flip-flop, etc. steps occurring.

Assuming that the bottom limit has not been exceeded, after a scan to the right, as noted above, the CFLAG flip-flop is cleared. Consequently, when the test at the top of FIG. 8 is made, i.e., when CFLAG flip-flop is tested to determine whether or not it is set or clear, it is found to be clear. Consequently, the appropriate path on the left side of FIG. 8 is followed. The next step in these paths is to determine whether or not the left scan limit has been exceeded. If the left scan limit has not exceeded, a sequence of operation similar to those illustrated on the right side of FIG. 8 are followed. Specifically, a scan to the left is made in the same manner as a scan to the right was previously made. First a test is made to determine whether or not the AODEL group count value is equal to zero. If the AODEL group count value is not equal to zero, the AODEL group count value is decremented and the program proceeds to the strobe video ADC, condition acquire flip-flop, etc. steps illustrated in FIG. 6. If the AODEL group count value is equal to zero, the AODEL group count value is reset to its initial value (e.g., four in the illustrated example of the invention). Then a test is made to determine whether or not the AODAZ moves count value is equal to zero to determine whether or not the AZ scan mirror should start moving to the left. If the AODAZ moves count is not equal to zero, the AODAZ value is decremented. Further, the AODAZ moves count value is decremented. Then the sequence proceeds to the strobe video ADC, etc. steps illustrated in FIG. 6. In this event, the AZ scan mirror remains stationary. Contrariwise, if the AODAZ moves count is determined to be zero the AZ scan mirror starts to move because GALAZ is decremented by one, prior to proceeding to the strobe video ADC, etc. steps.

In summary, during the search mode of operation, regardless of whether or not the search pattern is to be a line scan search pattern or an area scan search pattern, the field of view of the AOD starts at an initial position. This initial position of the AOD field of view is held fixed. The fixed position AOD field of view is scanned starting at the top center of the field of view and proceeding in a top-to-bottom and then retrace pattern in the direction of scanning (when scanning from right-to-left the pattern followed is the mirror image of the pattern illustrated in FIG. 7). After a portion of the AOD field of view has been scanned, the AZ scan mirror starts to sweep the AOD field of view in the scanning direction. The moving AOD field of view is continuously scanned in the same manner as when it was stepped. When the end of the scan line is reached, either the AOD field of view is retraced to the start end of the line (line search scan pattern) or the AOD field of view is swept in the opposite direction after the EL scan mirror is moved (area scan search pattern). In the latter case, a flag (the CFLAG) is cleared or set to change the scanning direction at the end of each scan line.

Figure 9:
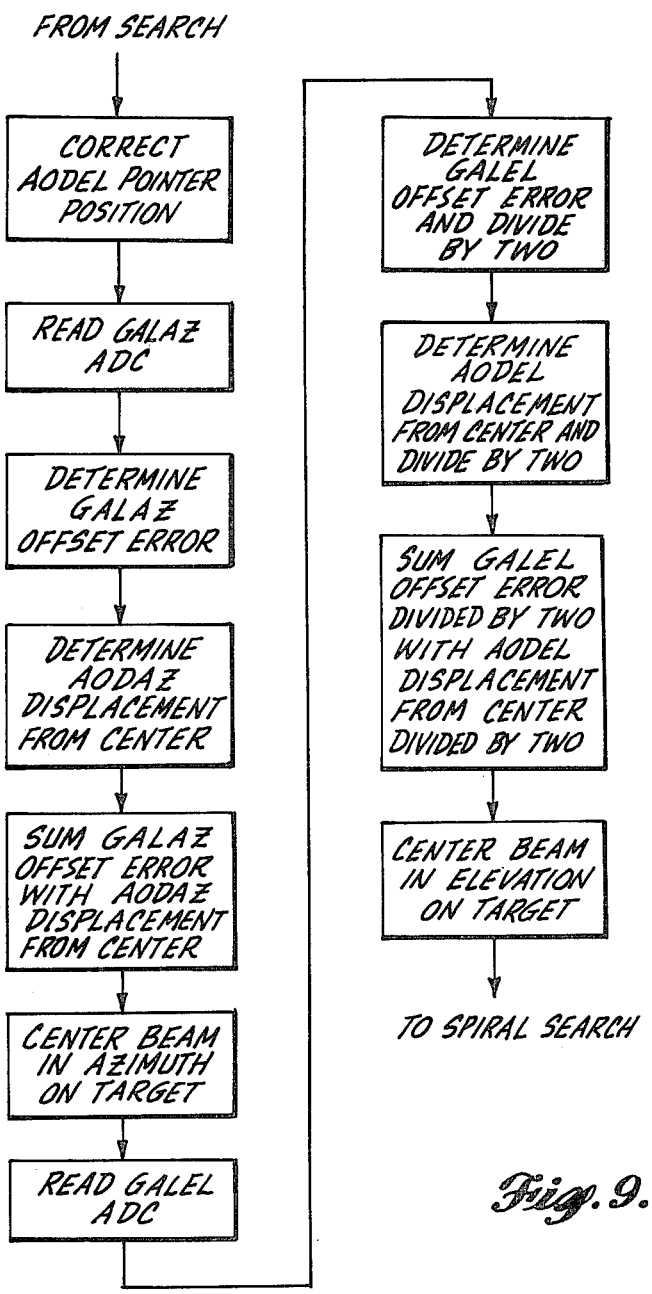
FIG. 9 is a flow diagram illustrating a pass-to-track subroutine suitable for use in FIG. 6.

Regardless of the nature of the scan search pattern followed during the search mode of operation, when a target is located, the controller immediately shifts from the search subroutine to the pass-to-track subroutine illustrated in FIG. 9 and next described. During the pass-to-track subroutine, scan mirror system (e.g., galvanometer) offset errors are determined and corrections made to the information describing the target direction, which is based on the scan mirror and AOD direction control data. Then the scan mirrors are repositioned such that the beam is directed toward the target when it is centered in the AOD field of view.

The first step in the pass-to-track subroutine is correcting the AODEL pointer position. In this regard, it will be appreciated that the AODEL pointer position was incremented prior to a determination being made that a target had been located. This incrementing was done in preparation for the next pass through the search subroutine. As a result, it is necessary to back up to the correct AODEL pointer position. Next, the position of the AZ scan mirror is determined by reading the output of the GALAZ ADC 58. This information is then used to determine the AZ scan mirror offset error. This is done by comparing the commanded position GALAZ value with the detected position GALAZ ADC output. In addition, the amount of azimuth AOD deflection from the center of the AOD when the target is acquired is determined. That is, the AODAZ displacement from the center AODAZ value is determined. Next, the AZ scan mirror (GALAZ) offset error is summed with the AODAZ displacement error and, then, the GALAZ value is changed so that the beam (in azimuth) will be positioned in the center of the AOD when the beam is impinging on the target the next time the GAL DACs are strobed.

Next, the position of the EL scan mirror is determined by reading the output of the GALEL ADC 60. Based on the commanded position and the detected position, a determination of the offset error of the EL scan mirror is made. This error is divided by two. Then, a determination of the elevation displacement from the center of the AOD, when the target was acquired, is made and this AODEL displacement error value is divided by two. Then, the EL scan mirror (GALEL) offset error divided by two is summed with the AODEL displacement error from the center divided by two. This information is then utilized to center the beam in the AOD when it is pointed at the target the next time the GAL DACs are strobed. This is done by appropriately changing the GALEL position value. At this point, the target is "centered" in the field of view of the AOD. That is, the next time the GAL DACs 42 and 44 are strobed the laser beam will both impinge on the target retroreflector and be centered in the AOD field of view. Next, the controller shifts to the spiral search subroutine illustrated in FIGS. 10A and 10B.

A pass is made through the spiral search subroutine between the search and the track subroutines to prevent loss of the target. Also, as illustrated in FIG. 6 and heretofore described, in the event the target is lost when the controller is in the track subroutine, it immediately shifts to the spiral search subroutine. Consequently, the spiral search subroutine can be entered either from the pass-to-track subroutine or from the track subroutine.

The first step of the spiral search subroutine is to initialize the AODAZ and AODEL values to the AOD center coordinates values. In the event this was done during the pass-to-track subroutine as part of the centering of the beam sequence, this step is redundant. In any event, the next step in the spiral search subroutine is to reset the acquire flip-flop. Then, the number of spiral searches to be performed prior to the spiral search subroutine terminating is set. Similarly, the number of spiral points in each spiral search is set. Finally, two registers identified as the N-step registers are set to an initial value of one. Next, the AODAZ and AODEL DACs are strobed, whereby the laser beam in the AOD is positioned in accordance with the AODAZ and AODEL coordinate values. Next, the CFLAG flip-flop is set. In addition, a second flip-flop identified as the ZFLAG flip-flop is set. Finally, the AOD step size is set. As with the number of spiral searches and the number of spiral points, the AOD step size can be set to any desired value. In essence, the step size determines the distance between the search points of the spiral search pattern.

After the foregoing steps have been completed, a test is made to determine whether or not the CFLAG flip-flop is clear. If the CFLAG flip-flop is not clear a test is made to determine whether or not the ZFLAG flip-flop is clear. If the ZFLAG flip-flop is not clear, the AODEL value is incremented by an amount equal to the chosen step size. If the ZFLAG flip-flop is clear, the AODEL value is decremented by the step size.

If the CFLAG flip-flop was found to be clear, a test is made to determine whether or not the ZFLAG flip-flop is clear. If the ZFLAG flip-flop is not clear the AODAZ value is decremented by an amount equal to the chosen step size. Contrariwise, if the ZFLAG flip-flop is found to be clear, the AODAZ value is increased by the step size.

Regardless of whether or not the AODEL value is step incremented or decremented or the AODAZ value is step incremented or decremented, after the appropriate one of the foregoing paths has been followed, a test is made to determine whether or not the AOD beam position is less than a predetermined low value. The low value is defined by the bottom and right edges of the AOD field of view. If the AODEL tested value is less than the low value the beam is below the bottom edge of the AOD field of view. Contrariwise, if the AODAZ value is less than the low value the beam is to the left of the left edge of the AOD field of view. Thus, if the low value is greater than either the AODAZ or AODEL value the beam is outside the AOD field of view. if this result occurs, the AOD tested value is set to the low limit. Thus, the related AOD value is forced to remain within the AOD field of view. Contrariwise, if the AOD position is not less than the low value a test is made to determine whether or not the AOD position is greater than a predetermined high value. The high value defines the upper and right limits of the AOD field of view. If the AOD position is greater than the high value regardless of whether its the AODEL value or an AODAZ value, the AOD tested value is set to the high limit. Thus, again the related AOD value is forced to remain in the AOD vield of view. Regardless of the path followed after the AOD position values are checked to determine whether they are less than the low limit or greater than the high limit, the total number of spiral points is decremented by one. Then a test is made to determine whether or not the spiral is completed. This is based on whether or not the number of spiral points has been decremented to zero. If the spiral is done, a test is made to determine whether or not all of the initially set number of spirals have been completed. If all of the spirals have been completed, the spiral search subroutine ends and the controller shifts to the search subroutine previously described. If all of the spirals are not completed, the spiral count is decremented and a new spiral search is begun, at the point immediately prior to the point where the acquire flip-flop was reset. Contrariwise, if the spiral is not completed, the spiral search subroutine shifts to the steps illustrated in FIG. 10B.

Figure 10A:
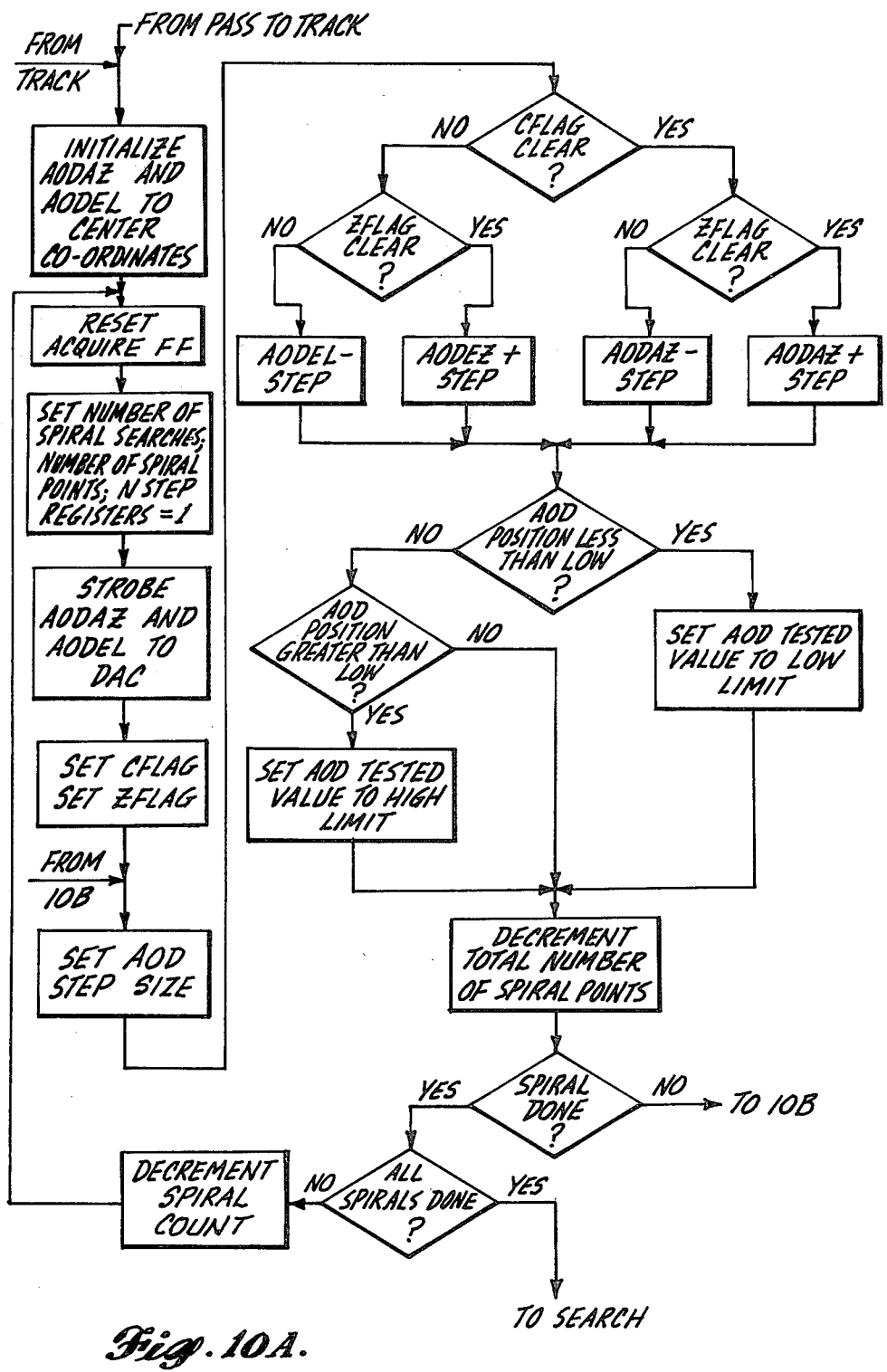
FIGS. 10A and 10B are a flow diagram of a spiral search subroutine suitable for use in FIG. 6.
Figure 10B:
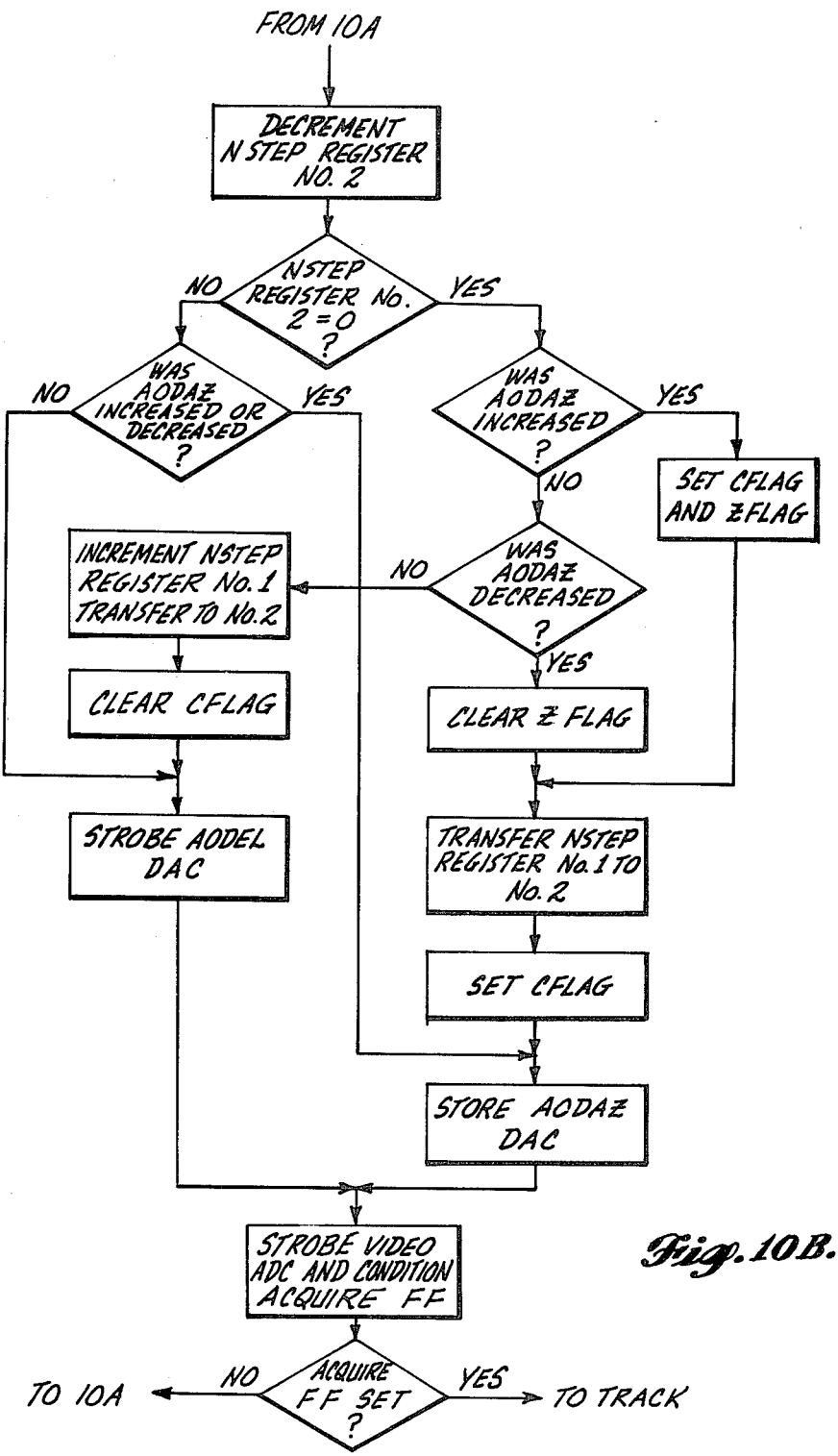

The first step in the portion of the spiral search subroutine illustrated in FIG. 10B is the decrementing of N-step Register No. 2. As noted above, there are two N-step Registers, which are herein identified as N-step Register No. 1 and N-step Register No. 2. N-step Register No. 2 is decremented during each pass through the spiral search subroutine, whereas N-step Register No. 1 is periodically incremented and its value used to reset N-step Register No. 2 such that the beam follows a spiral search path.

Returning to FIG. 10B, after N-step register No. 2 has been decremented, a test is made to determine whether or not the N-step Register No. 2 value is equal to zero. If the value is equal to zero, a directional change in the spiral search path occurs. Contrariwise, if the register value is not equal to zero, the same path is continued. Specifically, if the N-step Register No. 2 value is equal to zero, a test is made to determine whether or not AODAZ was increased. This test is based on which path of the four paths illustrated in the upper right-hand corner of FIG. 10A was followed. If the AODAZ step up (e.g., increase) path was followed the CFLAG and ZFLAG flip-flops are both set. If AODAZ was not stepped, a test is made to determine whether or not AODAZ step down path was followed. If AODAZ was stepped down the ZFLAG flip-flop is cleared and the CFLAG flip-flop remains unchanged. Regardless of which of these two paths is followed, after the CFLAG and ZFLAG flip-flops are conditioned, the N-step Register No. 1 value is transferred to N-step Register No. 2. Then, the CFLAG flip-flop is set. Thereafter, the AODAZ DAC is strobed. Only the AODAZ DAC is strobed because only the azimuth AOD position was changed, i.e., AODAZ was stepped up or down.

If AODAZ was neither stepped up or down, the AODAZ decreased test is negative, whereby N-step Register No. 1 is incremented and the incremented value is transferred to N-step Register No. 2. Thereafter, the CFLAG flip-flop is cleared. If N-step Register No. 2 was not found equal to zero, a test is made to determine whether or not AODAZ was increased or decreased. If AODAZ was not increased or decreased, of after the CFLAG flip-flop is cleared, the AODEL DAC is strobed. The AODEL DAC is strobed because in these instances only the AODEL value was changed. Contrariwise, if AODAZ was increased or decreased, the AODAZ DAC is strobed. In this case while no change of direction occurs, the AODAZ value was changed. Regardless of which of the AODEL or AODAZ DAC is strobed, after the appropriate one is strobed, the video ADC is strobed and the acquire flip-flop is suitably conditioned. Then, a test is made to determine whether or not the acquire flip-flop is set. If it is not set, which means that no target was located, the spiral search subroutine shifts to the point in the part of the subroutine illustrated in FIG. 10A immediately prior to where the AOD step size is set. Thereafter, another pass is made through the appropriate paths of the spiral search subroutine. Contrariwise, if the acquire flip-flop is found to be set, the spiral search subroutine ends and the controller shifts to the track subroutine.

Figure 11:
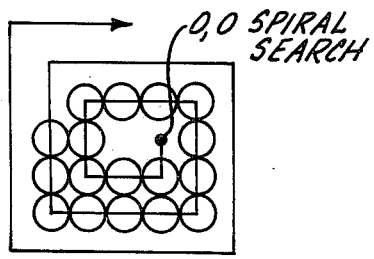
FIG. 11 illustrates the acousto-optic deflection system scan pattern when the spiral search subroutine illustrated in FIGS. 10A and 10B is followed.

As will be readily appreciated by those skilled in the art from the foregoing description and FIGS. 10A and 10B the state of the CFLAG and ZFLAG flip-flops determines the path of travel of the laser beam in the spiral search. The beam continues to move in the same up or down direction in elevation or the same right or left direction in azimuth until the state of one or both of these flip-flop changes, which state changes occur when the N-step Register No. 2 value equals zero. That is, as long as N-step Register No. 2 has a value greater than one the spiral search path continues in its previous direction. The N-step Register No. 2 is decremented each pass through the spiral search subroutine and where it reaches zero the direction of movement of the search beam changes by 90 degrees. Once in each spiral N-step Register No. 1 is incremented. This action causes the next spiral to be outside of the previous spiral. In this regard, attenuation is directed to FIG. 11, which illustrates the spiral search path that occurs when the spiral search subroutine illustrated in FIG. 10A and 10B is followed. The illustrated spiral search path starts at the AOD center point (0, 0) and rotates outwardly in a clockwise direction.

Figure 12A:
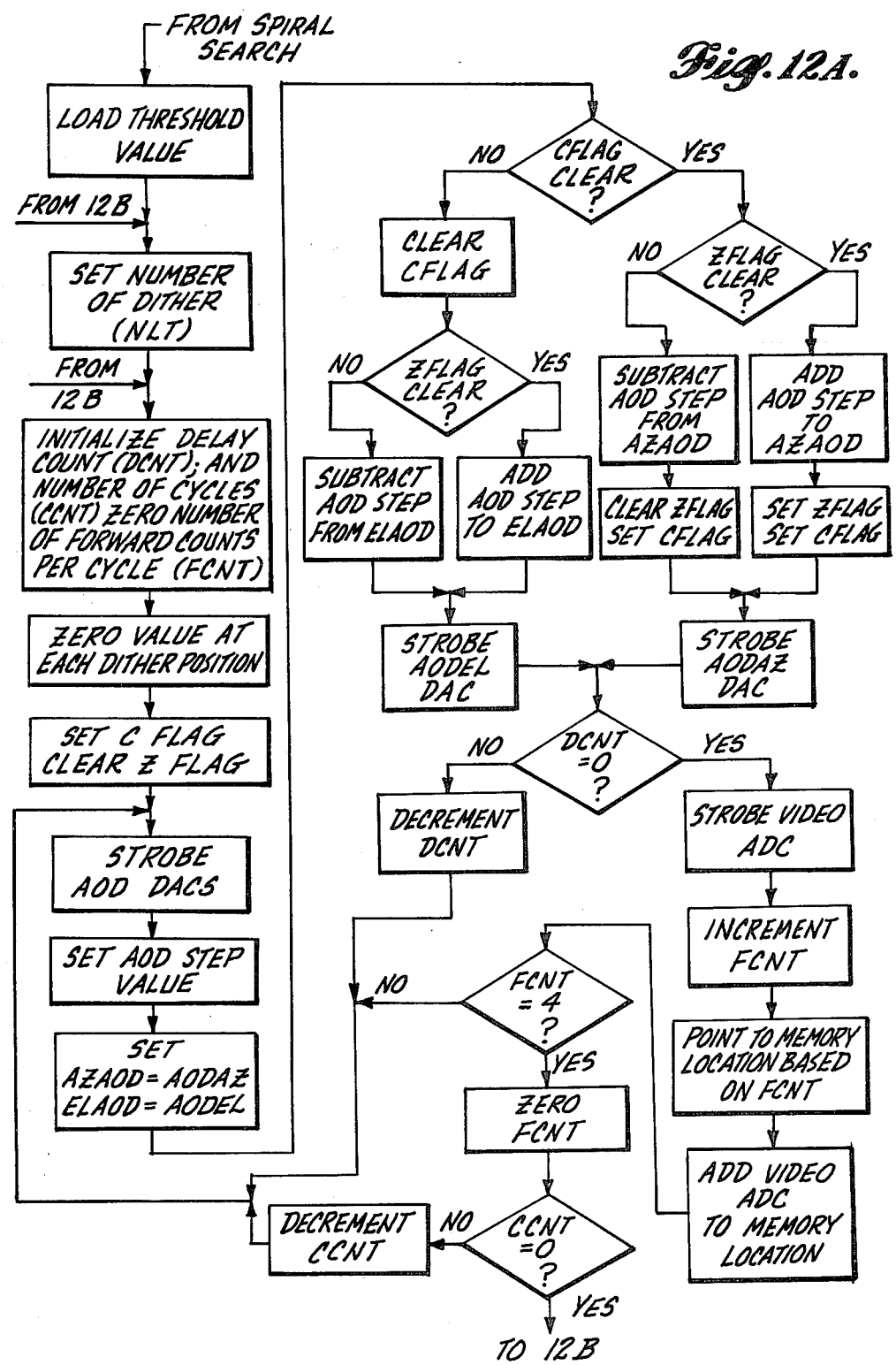
FIGS. 12A and 12B are a flow diagram of a track subroutine suitable for use in FIG. 6; and, FIG. 13 illustrates the acousto-optic deflection system dither pattern when the track subroutine illustrated in FIGS. 12A and 12B is followed.
Figure 12B:
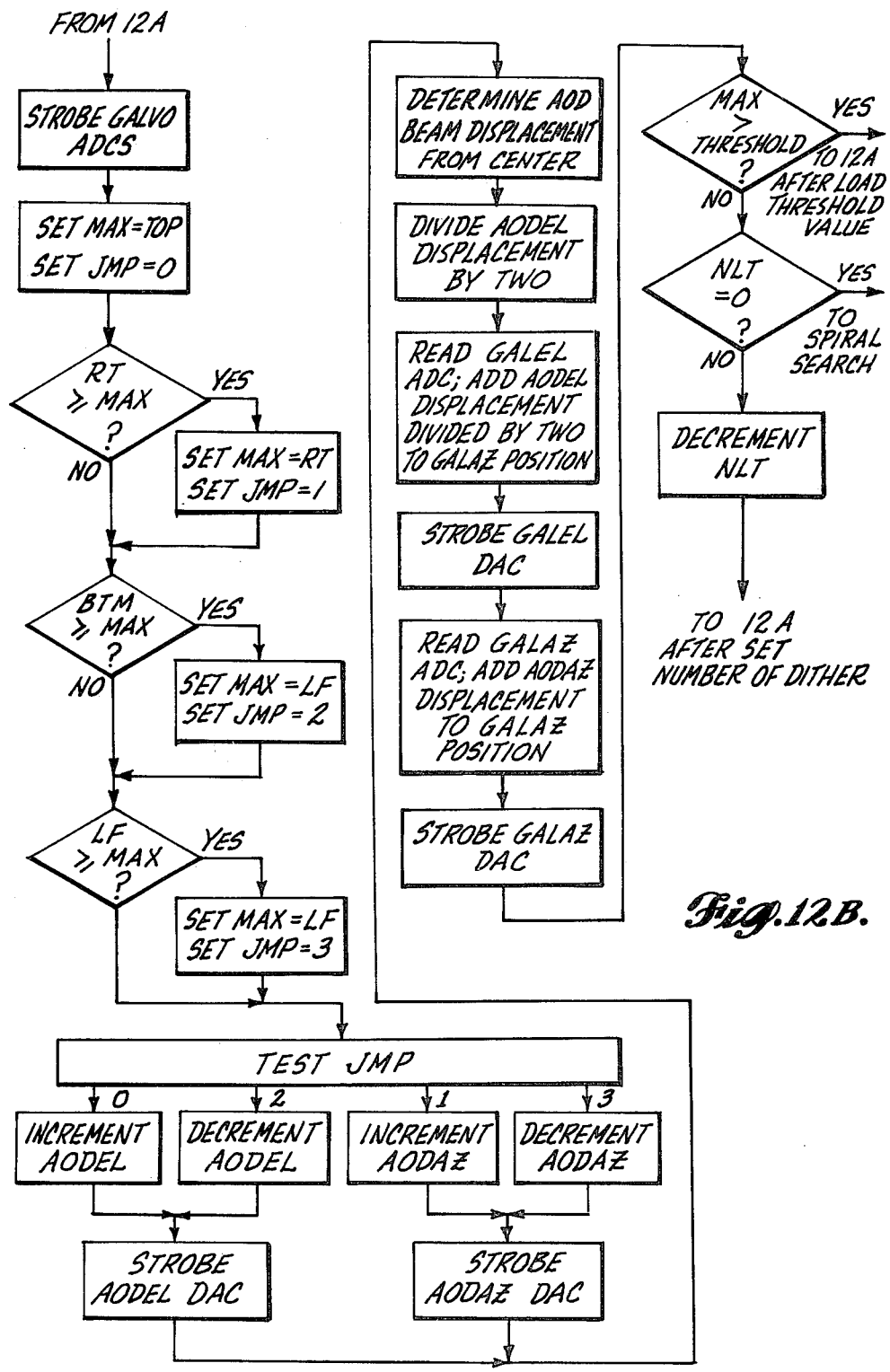

FIGS. 12A and 12B illustrate a track subroutine suitable for use by the controller 25. In essence, the track subroutine dithers, i.e., moves, the laser beam in a diamond pattern around the AOD center position. If the target moves, information, generated as the diamond pattern is followed, is used to change the GALAZ and GALEL values so that the AZ and EL scan mirrors are repositioned in a manner that seeks to maintain the laser beam centered in the AOD when the beam is impinging on the target retroreflector.

The first step in the track subroutine illustrated in FIGS. 12A and 12B is to load a threshold value for the output of the video ADC 75. In this regard, during searching a low threshold level may be used for target acquisition and during tracking a high threshold value used. In any event, after the threshold value has been loaded, the number of dithers (NLT) to take place before shifting to the spiral search subroutine in the event of apparent target loss is set. The next step is to initialize a delay count value (DCNT); and a number of cycles count value (CCNT). In addition, the number of forward counts per cycle (FCNT) is zeroed. These values are utilized during the track subroutine in the manner hereinafter described. Next, a stored value related to the intensity measured at each dither position is zeroed for each such position. Then, the CFLAG flip-flop is set and the ZFLAG flip-flop is cleared. Next, the AOD DACs are strobed; and, an AOD step value is set. Finally, for purposes of data identification a mnemonic identifier AZAOD is set equal to AODAZ and a mnemonic identifier ELAOD is set equal to AODEL.

After the foregoing initialization steps have been completed, a test is made to determine whether or not the CFLAG flip-flop is clear. If the CFLAG flip-flop is not clear the CFLAG flip-flop is cleared. Then a test is made to determine whether or not the ZFLAG flip-flop is clear. If the ZFLAG flip-flop is not clear, the AOD step value is subtracted from ELAOD. If the ZFLAG flip-flop is found to be clear, an AOD step value is added to ELAOD. Regardless of whether or not the step value is added or subtracted from ELAOD, after the appropriate path has been followed, the AODEL DAC is strobed using the stepped ELAOD value.

Figure 13:
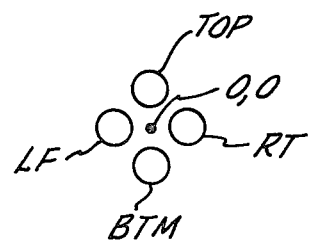

If the CFLAG flip-flop was found to be clear, a test is made to determine whether or not the ZFLAG flip-flop is clear. If the ZFLAG flip-flop is not found to be clear, the AOD step value is subtracted from AZAOD. Thereafter, the ZFLAG flip-flop is cleared and the CFLAG flip-flop is set. If the ZFLAG flip-flop was found to be clear, the AOD step value is added to AZAOD. Thereafter, both the ZFLAG and CFLAG flip-flops are set. Regardless of the path of travel followed, after the CFLAG and ZFLAG flip-flops have been conditioned, the AODAZ DAC is strobed using the stepped AZAOD value. Each of the four paths just described causes the beam to point toward one of the positions in the diamond dither pattern illustrated in FIG. 13.

Regardless of which of the AODEL or AODAZ DAC is strobed, after the appropriate one has been strobed, a test is made to determine whether the delay count value (DCNT) is equal to zero. If DCNT is not equal to zero, DCNT is decremented and the subroutine returns to the point in the initialization sequence where the AOD DACs are strobed. If DCNT is found to equal zero, the video ADC is strobed and, then, the number of forward counts per cycle value (FCNT) is incremented. Next a position in memory based on FCNT is pointed to. Thereafter, the video ADC value is added to the value at the memory location being pointed to. Next, a test is made to determine whether or not FCNT is equal to four. If FCNT does not equal four, the track subroutine shifts to the point in the initialization sequences where the AOD DACs are strobed. If FCNT is equal to four, FCNT is set equal to zero. Then, a test is made to determine whether or not the number of cycles value (CCNT) is equal to zero. If CCNT equals zero, the track subroutine shifts to the portion thereof illustrated in FIG. 12B. If CCNT is not equal to zero, CCNT is decremented and the track subroutine shifts to the point in the initialization subroutine where the AOD DACs are strobed.

At this point, it will be appreciated by those skilled in the art that the various positions in the dither pattern are identified as one plus (+) or one minus (−) step position in azimuth or elevation away from the ELAOD and AZAOD positions, which initially start at the center of the AOD. As each position is identified in sequence (which depends upon the changing state of the CFLAG and ZFLAG flip-flops), the video ADC is strobed and its output is added to the previous video ADC output values for the identified location. This continues for several dither cycles.

After each dither position is acquired and the video ADC output read and added to the value in memory for that position, the AZAOD and ELAOD values are reset to the center position before the next pass through the subroutine. As noted above each pass results in the next dither position, in the sequence being tested, the specific position being identified by the state of the CFLAG and ZFLAG flip-flops. The state of at least one of the CFLAG and ZFLAG flip-flops is changed during each pass through the portion of the track subroutine illustrated in FIG. 12A. As a result, a new position in the sequence occurs during each pass.

After the preset number of dither cycles have been completed, i.e., CCNT reaches zero, as previously noted, the track subroutine shifts to the portion illustrated in FIG. 12B. The first step in this part of the track subroutine is to strobe the AZ and EL scan mirror (i.e., the galvanometer) ADCs to determine the position of the mirrors. Then, a value noted as MAX is set equal to the accumulated video ADC value stored in memory for the top dither position (ELAOD+step). In addition, a jump pointer denoted JMP is set equal to zero. Next, the accumulated video ADC value stored in memory for the right position of the dither pattern (AZAOD+-step) is compared with MAX. If the right value (RT) is greater than or equal to MAX, MAX is set equal to RT and JMP is set equal to one. If these changes occur, of if RT is not greater than or equal to MAX, a test is made to determine whether or not the accumulated video ADC value stored in memory for the bottom position of the dither pattern (ELAOD−step) is greater than or equal to MAX. If the bottom value (BTM) is greater than or equal to MAX, MAX is set equal to BTM and JMP is set equal to two. If these changes occur, or if BTM is not greater than or equal to MAX, a test is made to determine whether or not the accumulated video ADC value stored in memory for the left position of the dither pattern (AZAOD−step) is greater than or equal to MAX. If the left value (LF) is greater than or equal to MAX, the MAX is set equal to LF and JMP is set equal to three. If these changes occur of if LF is not greater than or equal to MAX, JMP is tested. Prior to discussing the result of testing JMP it is pointed out that the foregoing sequence of steps has resulted in the accumulated video ADC outputs at each of the dither positions being compared with each other. The position having the greatest accumulated value was determined the final state of JMP (i.e., 0, 1, 2 or 3). If JMP is found equal to zero (0) when it is tested, AODEL is incremented; if JMP is found equal to one (1), AODAZ is incremented; if JMP is found equal to two (2), AODEL is decremented; and, if JMP is found equal to three (3), AODAZ is decremented. As a result, the AOD beam direction is changed toward the dither position having the highest accumulated video ADC value.

If AODEL was incremented or decremented because JMP equaled zero (0) or two (2), the AODEL DAC is strobed. Contrariwise, if AODAZ was incremented or decremented because JMP equaled one (1) or three (3), the AODAZ DAC is strobed. Thereafter, a determination of the amount of AOD beam displacement from the center of the AOD is made. The displacement in the elevation (i.e., the AODEL displacement) is divided by two. Next, the EL scan mirror (GALEL) ADC is read. Then, the AODEL displacement divided by two value is added to the GALEL position value. This creates a new GALEL value which is strobed to the EL scan mirror (GALEL) DAC. Next, the AZ scan mirror (GALAZ) ADC is read. The AODAZ displacement from center value is added to the GALAZ position value and the result is strobed to the GALAZ DAC.

After the beam has been repositioned in the AOD by the scan mirrors, MAX is tested to determine whether or not it is greater than the previously set threshold value. If MAX is greater, the track subroutine shifts to the point in the initialization sequence (FIG. 12A) where the threshold value is loaded. If MAX is less than the threshold value, a test is made to determine whether or not the number of dithers (NLT) is equal to zero. If NLT is not equal to zero, NLT is decremented and the track subroutine shifts to the point in the initialization subroutine where the number of dithers is set. Contrariwise, if NLT is equal to zero, the track subroutine ends and the controller shifts to the spiral search subroutine. In this case, of course, the object being tracked has been lost; and the spiral search subroutine is implemented in an effort to locate the target while it remains in the AOD field of view. If the target leaves the AOD field of view and thus is not found during the spiral search subroutine, the controller shifts back to the search subroutine after the spiral search subroutine is completed, as previously described.

As will be readily appreciated from the foregoing description, the invention provides an apparatus for searching a given area to locate a target having a retroreflector or other reflecting medium mounted thereon. The search can follow a line scan search pattern or an area scan search pattern. Once the target is located the acquisition and tracking system of the invention immediately shifts to a spiral search mode of operation; and, then, to a tracking mode of operation. Normally a single pass through the spiral search subroutine is sufficient. During the tracking subroutine the beam is maintained centered in the AOD and on the target by following a dither pattern that "looks" for target movement; and moves the scan mirrors accordingly.

The scan mirrors provide wide angular scanning, even though positioning and repositioning of the scan mirrors is somewhat slow. The AOD compensates for the slowness of scan mirror positioning by providing a rapid scanning capability in a relatively small field of view. By maintaining the AOD beam centered using the deflection mirrors, the entire field of view of the AOD is available during both the tracking and the spiral search subroutines. Further, the inclusion of an AOD, rather than other forms of scannable devices, results in a rugged system that is usable in a wide variety of environments.

While a preferred embodiment of the invention has been illustrated and described, it will be appreciated that various changes can be made therein without departing from the spirit and scope of the invention. For example, the various subroutines illustrated for controlling the operation of the controller 25 are merely illustrative. Various modifications can be made in these subroutines or other subroutines developed for performing the same control functions. Consequently, the invention can be practiced otherwise than as specifically described herein.

The embodiments of the invention in which an exclusive property or privilege is claimed are defined as follows:

1. An electromagnetic beam acquisition and tracking system for acquiring and tracking a target supporting a reflection device for redirecting an electromagnetic beam back along its incident axis, said electromagnetic beam acquisition and tracking system comprising:
   (A) a source of electromagnetic radiation for producing a coherent electromagnetic beam of energy;
   (B) a mechanical deflection system for intersecting and deflecting said electromagnetic beam produced by said source of electromagnetic radiation;
   (C) an acousto-optic deflection system for intersecting and deflecting said electromagnetic beam produced by said source of electromagnetic radiation, said mechanical deflection system and said acousto-optic deflection system being positioned so as to serially deflect said electromagnetic beam;
   (D) a return beam detection system for detecting a returning electromagnetic beam redirected back along its incident axis by a reflection device mounted on a target when said electromagnetic beam impinges on said reflection device; and,
   (E) a controller coupled to said mechanical deflection system, said acousto-optic deflection system and said return beam detection system for:
      (1) receiving a signal from said return beam detection system when a returning electromagnetic beam is detected by said return beam detection system; and,
      (2) controlling said mechanical deflection system and said acousto-optic deflection system such that: (a) said electromagnetic beam is swept in a predetermined search pattern until a target is acquired by said return beam detection system detecting a returning electromagnetic beam; and, (b) thereafter, said beam is directed towards said target as determined by said return beam detection system detecting a returning electromagnetic beam.

2. An electromagnetic beam acquisition and tracking system as claimed in claim 1 wherein said mechanical deflection system deflects said electromagnetic beam along at least one axis.

3. An electromagnetic beam acquisition and tracking system as claimed in claim 2 wherein said acousto-optic deflection system deflects said electromagnetic beam along two orthogonal axes at least one of which is coincident with said at least one axis of deflection of said mechanical deflection system.

4. An electromagnetic beam acquisition and tracking system as claimed in claim 3 wherein said mechanical deflection system includes a scan mirror positioned so as to intersect said electromagnetic beam and a servo control system for controlling the position of said scan mirror.

5. An electromagnetic beam acquisition and tracking system as claimed in claim 4 wherein said acousto-optic deflection system includes a two-axis acousto-optic deflector and two control signal channels connected to said controller to receive acousto-optic control signals from said controller, one control signal channel connected to said acousto-optic deflector to control deflection along one axis of said acousto-optic deflector and the other control channel connected to said acousto-optic deflector to control deflection along the other axis of said acousto-optic deflector.

6. An electromagnetic beam acquisition and tracking system as claimed in claim 5 wherein said acousto-optic control signals produced by said controller are digital signals and wherein each of said control signal channels includes a digital-to-analog converter connected to said controller for converting a digital acousto-optic control signal from digital form to analog form, a voltage controlled oscillator connected to the output of said digital-to-analog converter for producing an audio output signal having a frequency related to the analog output of said digital-to-analog converter and a radio frequency amplifier connected to the output of said voltage controlled oscillator for amplifying the output of said voltage controlled oscillator, the output of said radio frequency amplifier connected to a predetermined axis control input of said two-axis acousto-optic deflector.

7. An electromagnetic beam acquisition and tracking system as claimed in claim 6 wherein said controller controls said acousto-optic deflection system and said mechanical deflection system such that said search pattern is a line scan search pattern.

8. An electromagnetic beam acquisition and tracking system as claimed in claim 7 wherein said controller controls said mechanical deflection system in a manner that seeks to maintain said electromagnetic beam centered in said acousto-optic deflector after a target is acquired.

9. An electromagnetic beam acquisition and tracking system as claimed in claim 8 wherein said controller controls said acousto-optic deflection system such that said electromagnetic beam is dithered around said target after a target is acquired.

10. An electromagnetic beam acquisition and tracking system as claimed in claim 9 wherein said controller controls said acousto-optic deflection system such that said electromagnetic beam is moved outwardly in a spiral pattern over a predetermined field of view in the event an acquired target is lost, i.e., a returning electromagnetic beam is no longer detected by said return beam detection system.

11. An electromagnetic beam acquisition and tracking system as claimed in claim 3 wherein said mechanical deflection system deflects said electromagnetic beam along two orthogonal axes, said two orthogonal axes being coincident with said two orthogonal axes of deflection of said acousto-optic deflection system.

12. An electromagnetic beam acquisition and tracking system as claimed in claim 11 wherein said mechanical deflection system includes first and second scan mirrors positioned so as to intersect said electromagnetic beam and first and second servo control systems for controlling the position of said first and second scan mirrors, respectively.

13. An electromagnetic beam acquisition and tracking system as claimed in claim 12 wherein said acousto-optic deflection system includes a two-axis acousto-optic deflector and two control signal channels connected to said controller to receive acousto-optic control signals from said controller, one control signal channel connected to said acousto-optic deflector to control deflection along one axis of said acousto-optic deflector and the other control channel connected to said acousto-optic deflector to control deflection along the other axis of said acousto-optic deflector.

14. An electromagnetic beam acquisition and tracking system as claimed in claim 13 wherein said acousto-optic control signals produced by said controller are digital signals and wherein each of said control signal channels includes a digital-to-analog converter connected to said controller for converting a digital acousto-optic control signal from digital form to analog form, a voltage controlled oscillator connected to the output of said digital-to-analog converter for producing an audio output signal having a frequency related to the analog output of said digital-to-analog converter and a radio frequency amplifier connected to the output of said voltage controlled oscillator for amplifying the output of said voltage controlled oscillator, the output of said radio frequency amplifier connected to a predetermined axis control input of said two-axis acousto-optic deflector.

15. An electromagnetic beam acquisition and tracking system as claimed in claim 14 wherein said controller controls said acousto-optic deflection system and said mechanical deflection system such that said search pattern is a line scan search pattern.

16. An electromagnetic beam acquisition and tracking system as claimed in claim 15 wherein said controller controls said mechanical deflection system in a manner that seeks to maintain said electromagnetic beam centered in said acousto-optic deflector after a target is acquired.

17. An electromagnetic beam acquisition and tracking system as claimed in claim 16 wherein said controller controls said acousto-optic deflection system such that said electromagnetic beam is dithered around said target after a target is acquired.

18. An electromagntic beam acquisition and tracking system as claimed in claim 17 wherein said controller controls said acousto-optic deflection system such that said electromagnetic beam is moved outwardly in a spiral pattern over a predetermined field of view in the event an acquired target is lost, i.e., a returning electromagnetic beam is no longer detected by said return beam detection system.

19. An electromagnetic beam acquisition and tracking system as claimed in claim 14 wherein said controller controls said acousto-optic deflection system and said mechanical deflection system such that said search pattern is an area scan search pattern.

20. An electromagnetic beam acquisition and tracking system as claimed in claim 19 wherein said controller controls said mechanical deflection system in a manner that seeks to maintain said electromagnetic beam centered in said acousto-optic deflector after a target is acquired.

21. An electromagnetic beam acquisition and tracking system as claimed in claim 20 wherein said controller controls said acousto-optic deflection system such that said electromagnetic beam is dithered around said target after a target is acquired.

22. An electromagnetic beam acquisition and tracking system as claimed in claim 21 wherein said controller controls said acousto-optic deflection system such that said electromagnetic beam is moved outwardly in a spiral pattern over a predetermined field of view in the event an acquired target is lost, i.e., a returning electromagnetic beam is no longer detected by said return beam detection system.

23. An electromagnetic beam acquisition and tracking system as claimed in claim 1 wherein said controller controls said acousto-optic deflection system and said mechanical deflection system such that said search pattern is a line scan search pattern.

24. An electromagnetic beam acquisition and tracking system as claimed in claim 23 wherein said controller controls said mechanical deflection system in a manner that seeks to maintain said electromagnetic beam centered in said acousto-optic deflection system after a target is acquired.

25. An electromagnetic beam acquisition and tracking system as claimed in claim 24 wherein said controller controls said acousto-optic deflection system such that said electromagnetic beam is dithered around said target after a target is acquired.

26. An electromagnetic beam acquisition and tracking system as claimed in claim 25 wherein said controller controls said acousto-optic deflection system such that said electromagnetic beam is moved outwardly in a spiral pattern over a predetermined field of view in the event an acquired target is lost, i.e., a returning electromagnetic beam is no longer detected by said return beam detection system.

27. An electromagnetic beam acquisition and tracking system as claimed in claim 1 wherein said controller controls said acousto-optic deflection system and said mechanical deflection system such that said search pattern is an area scan search pattern.

28. An electromagnetic beam acquisition and tracking system as claimed in claim 27 wherein said controller controls said mechanical deflection system in a manner that seeks to maintain said electromagnetic beam centered in said acousto-optic deflection system after a target is acquired.

29. An electromagnetic beam acquisition and tracking system as claimed in claim 28 wherein said controller controls said acousto-optic deflection system such that said electromagnetic beam is dithered around said target after a target is acquired.

30. An electromagnetic beam acquisition and tracking system as claimed in claim 29 wherein said controller controls said acousto-optic deflection system such that said electromagnetic beam is moved outwardly in a spiral pattern over a predetermined field of view in the event an acquired target is lost, i.e., a returning electromagnetic beam is no longer detected by said return beam detection system.

* * * * *